(12) United States Patent
Miyahara et al.

(10) Patent No.: US 10,726,318 B2
(45) Date of Patent: Jul. 28, 2020

(54) INFORMATION PROCESSING APPARATUS AND NON-TRANSITORY COMPUTER READABLE STORAGE MEDIUM

(71) Applicant: CANON KABUSHIKI KAISHA, Tokyo (JP)

(72) Inventors: Nobuaki Miyahara, Moriya (JP); Ryo Fujita, Tokyo (JP); Yoshitaka Oba, Matsudo (JP); Toru Shinnae, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/426,378

(22) Filed: May 30, 2019

(65) Prior Publication Data

US 2019/0377990 A1 Dec. 12, 2019

(30) Foreign Application Priority Data

Jun. 6, 2018 (JP) ................. 2018-108582

(51) Int. Cl.
*G06K 15/00* (2006.01)
(52) U.S. Cl.
CPC ......... *G06K 15/404* (2013.01); *G06K 15/005* (2013.01); *G06K 2215/0088* (2013.01)
(58) Field of Classification Search
CPC .................................................. G06K 15/404
See application file for complete search history.

(56) References Cited

U.S. PATENT DOCUMENTS

| 6,980,310 | B1 | 12/2005 | Shimada et al. |
| 2010/0090387 | A1* | 4/2010 | Takenouchi ........... B65H 33/08 270/58.01 |
| 2015/0178600 | A1* | 6/2015 | Kadobayashi ..... G06K 15/1806 358/1.14 |
| 2016/0139857 | A1* | 5/2016 | Kuroda ................ G06K 15/005 358/1.15 |

FOREIGN PATENT DOCUMENTS

JP 2013-146898 A 8/2013

\* cited by examiner

*Primary Examiner* — Lennin R RodriguezGonzalez
(74) *Attorney, Agent, or Firm* — Venable LLP

(57) ABSTRACT

An image forming apparatus can facilitate a determination whether a sheet having an image formed thereon, which is discharged by a designated processed job, is allowed to be taken out or not. The image forming apparatus determines whether or not the sheet having the image formed thereon discharged by the designated processed job is stacked on a stacking unit on which the sheet having the image formed thereon discharged by a job currently performing image forming processing, based on stack state information which can be updated in real time. When a sheet having the image formed thereon is not allowed to be taken out, the image of the portion corresponding the sheet is highlighted. Further, a waiting time is displayed on the display.

12 Claims, 21 Drawing Sheets

FIG. 15A

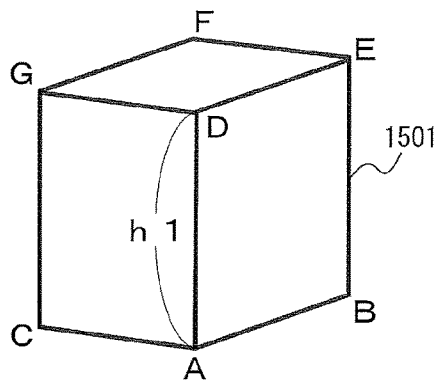

FIG. 15B

| | COORDINATE POSITION | 1502 |
|---|---|---|
| A | TRAY POSITION COORDINATES (x, y) | |
| B | x+33 , y-13 | |
| C | x-35 , y-5 | |
| D | x, y-h1 | |
| E | x+33 , y-h1-13 | |
| F | x-5 , y-h1-17 | |
| G | x-35 , y-h1-5 | |

FIG. 15C
1303

```
<path stroke="black" stroke-width="1" fill="white" fill-opacity="0.7" d="M x (y-h1) L (x+33) (y-h1-13) L (x-5) (y-h1-17) L (x-35) (y-h1-5) Z"/>
<path stroke="black" stroke-width="1" fill="white" fill-opacity="0.7" d="M x (y-h1) L (x-35) (y-h1-5) L (x-35) (y-5) L x y Z"/>
<path stroke="black" stroke-width="1" fill="white" fill-opacity="0.7" d="M x (y-h1) L x y L (x+33) (y-13) L (x+33) (y-h1-13) Z"/>
```

FIG. 16A

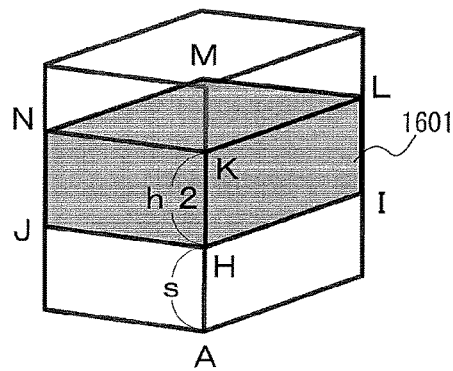

FIG. 16B

| | COORDINATE POSITION | 1602 |
|---|---|---|
| A | TRAY POSITION COORDINATES (x, y) | |
| H | x , y-s | |
| I | x+33 , y-s-13 | |
| J | x-35 , y-s-5 | |
| K | x, y-s-h2 | |
| L | x+33 , y-s-h2-13 | |
| M | x-5 , y-s-h2-17 | |
| N | x-35 , y-s-h2-5 | |

```
<path stroke="black" stroke-width="1" fill="gray" fill-opacity="0.7" d="M x (y-s-h2) L (x+33) (y-s-h2-13) L (x-5) (y-s-h2-17) L (x-35) (y-s-h2-5) Z"/>
<path stroke="black" stroke-width="1" fill="gray" fill-opacity="0.7" d="M x (y-s-h2) L (x-35) (y-s-h2-5) L (x-35) (y-s-5) L x (y-s) Z"/>
<path stroke="black" stroke-width="1" fill="gray" fill-opacity="0.7" d="M x (y-s-h2) L x (y-s) L (x+33) (y-s-13) L (x+33) (y-s-h2-13) Z"/>
```

INFORMATION PROCESSING APPARATUS AND NON-TRANSITORY COMPUTER READABLE STORAGE MEDIUM

BACKGROUND OF THE INVENTION

Field of the Invention

The present disclosure relates to an image forming apparatus to which a plurality of discharge apparatus can be attached, an information processing terminal and a storage medium storing computer program.

Description of the Related Art

There are known service forms for image formation called print on demand (POD) and production printing. In such service forms, for example, small-lot and high-variety image forming orders are received from customers. Then, images are quickly formed using an image forming apparatus operating at high speed to deliver the orders. At this time, images are rapidly formed onto a large amount of sheets (sheet-like media, the same holds true in the following), and the sheets are discharged. A large-capacity stacker is prepared at a discharge destination. The large-capacity stacker of this type stacks several thousands of sheets at one time. A plurality of large-capacity stackers may be connected so that, even when one large-capacity stacker is full, image formation can be continued by automatically switching a discharge destination to another large-capacity stacker. In this case, sheets having images formed thereon and corresponding to one image forming job are discharged to a plurality of discharge destinations in a divided manner. In the following description, the "sheet having the image formed thereon" is referred to as "sheet" in some cases.

Meanwhile, an operator performs work of taking out the discharged sheets having images formed thereon to proceed to the next step. However, it is not easy to identify a position of a sheet corresponding to an image forming job from a large amount of sheets, which may be discharged to a plurality of distinct portions. To address the above-mentioned issue, in the technology described in Japanese Patent Application Laid-open No. 2013-146898, a request for allowing the operator to check the sheet discharge destination is received for each image forming job. Then, an apparatus (sheet discharge apparatus, for example, large-capacity stacker) at the discharge destination is displayed on a predetermined display apparatus. In this manner, the operator is allowed to check the discharge destination of the sheet to which the sheet is discharged corresponding to each image forming job, and to reliably take out the sheet corresponding to a processed job.

In the technology disclosed in Japanese Patent Application Laid-open No. 2013-146898, the sheet discharge destination is displayed for each image forming job. In addition, when an image forming job is selected from the discharge history list, in the diagram showing the stacking state of the large-capacity stacker, the color of a portion corresponding to the selected image forming job is changed. Therefore, it is possible to easily understand where the selected image forming job is stacked. However, even if image formation by the selected image formation job has been completed, in a case where sheets are discharged to the same discharge destination in a subsequent image formation job, in the technology disclosed in Japanese Patent Application Laid-Open No. 2013-146898, it is not possible to determine whether the sheets corresponding to the selected image forming job can be taken out or not. Particularly, in a case where a large-capacity stacker is used, several thousand sheets may be stacked in the stacker; therefore, depending on the number of sheets of the subsequent image forming job, even if the image forming apparatus itself is of a high-speed printing type, the user may not take out the sheet for several tens of minutes.

SUMMARY OF THE INVENTION

An image forming apparatus according to the present disclosure includes an image forming unit configured to form an image on a sheet based on an image forming job; a sheet stacking unit on which a sheet, which is discharged from the image forming unit, having an image formed thereon is to be stacked; a storage unit configured to store stack state information and list information of a processed job for which the image forming has been performed, wherein the stack state information represents a sheet stack state of the sheet having the image formed thereon for each image forming job for the sheet stacking unit; and a control unit configured to generate, for each image forming job, a sheet image which visualizes the sheet stack state of the sheet stacking unit based on the sheet stacking information, and to control a display unit to display the sheet image; wherein the control unit is configured to determine, upon detecting that any one of the processed jobs is designated from the list information, whether or not the sheet having the image formed thereon which is discharged by the designated processed job is allowed to be taken out from the sheet stacking unit, and control, in a case where the sheet is not allowed to be taken out, the display unit to display the sheet image corresponding to the designated processed job in a manner which is different from that for displaying the sheet image corresponding to the designated processed job in a case where the sheet is allowed to be taken out.

Further features of the present disclosure will become apparent from the following description of embodiments (with reference to the attached drawings).

BRIEF DESCRIPTION OF THE DRAWINGS

FIG. 15A is an illustration of a sheet bundle image, FIG. 15B is an illustration of a list, and FIG. 15C is an illustration of a rendering command using scalable vector graphics (SVG).

FIG. 16A is an illustration of a sheet bundle image, FIG. 16B is an illustration of a list, and FIG. 16C is an illustration of a rendering command using SVG.

DESCRIPTION OF THE EMBODIMENTS

First Embodiment

Figure 1:
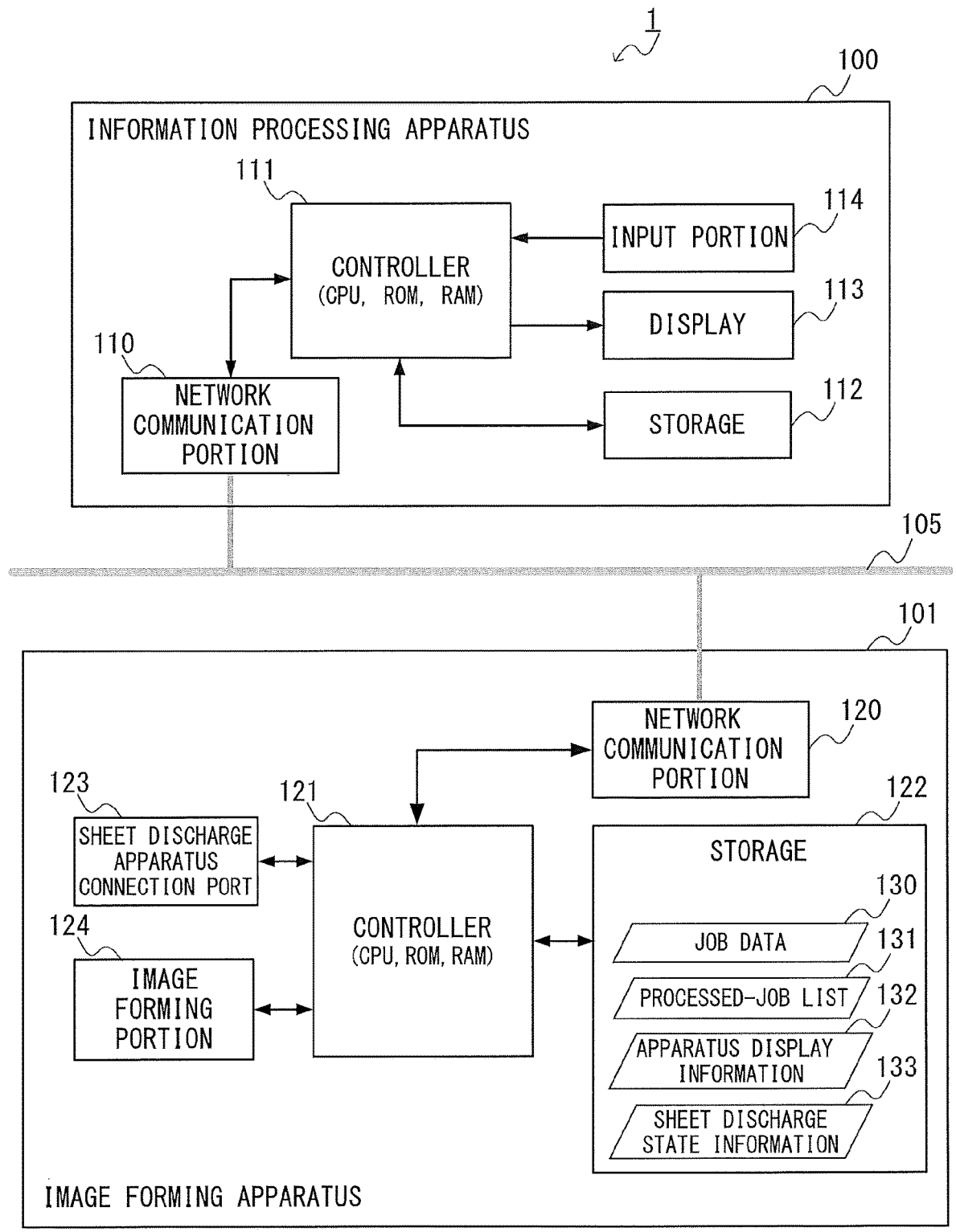
FIG. 1 is a configuration diagram of an image forming system.

FIG. 1 is a diagram for illustrating a schematic configuration example of an image forming system to which the present disclosure is applied. An image forming system 1 includes an information processing apparatus 100 and an image forming apparatus 101, which are connected to a communication network 105. The first embodiment represents an example in which one information processing apparatus 100 and one image forming apparatus 101 are provided, but a plurality of image forming apparatus 101 may be connected. The communication network 105 is a local area network (LAN). As the communication network 105, a wide area network (WAN), a combination of the LAN and the WAN, or a wired network may be employed instead.

The information processing apparatus 100 includes a network communication portion 110, a controller 111, a storage 112, a display 113, and an input portion 114. The network communication portion 110 controls the communication performed with the communication network 105. The storage 112 is a storage unit, which stores a large amount of data in a short or long term. The display 113 is a display unit, which performs various types of display of information for an operator, e.g., a user of the image forming system. In the first embodiment, the display 113 displays, for example, a sheet image and a whole system image, etc., to be described later. The input portion 114 receives various instructions from the operator, a range designation, input data, and designation of an image forming job. When the display 113 is constructed of a touch panel, various instructions from the operator also can be input from the display 113.

The controller 111 is one type of computer including a central processing unit (CPU), a read only memory (ROM), and a random access memory (RAM). The CPU executes a computer program for terminal control to execute or provide various functions for the information processing apparatus 100. This operation is described later. The ROM stores the above-mentioned computer program and the like. The RAM is a work memory for the CPU.

The image forming apparatus 101 includes a network communication portion 120, a controller 121, a storage 122, a sheet discharge apparatus connection port 123, and an image forming portion 124. The network communication portion 120 is a communication unit, which controls the communication performed with the communication network 105. The storage 122 is a storage unit, which stores a large amount of data in a short or long term. The sheet discharge apparatus connection port 123 is a connection unit, which connects the sheet discharge apparatus. The image forming portion 124 forms an image onto a sheet for each input image forming job.

The controller 121 is a computer including a CPU, a ROM, and a RAM, or may be an embedded computer. The CPU executes a computer program for image formation control to form various functions for the image forming apparatus 101 and operate as a control unit for controlling an operation of each of the functions. This operation is described later. The ROM stores the above-mentioned computer program for image formation control. The RAM is a work memory for the CPU.

The storage 122 of the image forming apparatus 101 stores job data 130, a processed-job list 131, apparatus display information 132, and stack state information 133. Examples of the job data 130 include image data and instruction data representing the details of the input image forming job, data obtained after execution of the image forming job, and data obtained during the process of execution of the image forming job. The processed-job list 131 is list information storing the image forming jobs executed by the image forming apparatus 101 as the processed jobs. For example, the processed-job list 131 stores job attributes such as a job ID, a job name, the number of pages, the number of bundles, and a sheet in association with one another.

The apparatus display information 132 is one type of first information representing the entire arrangement mode (system configuration) of image forming device and a plurality of sheet stacking devices, and is referred to when a whole system image to be described later is generated. In this example, since the image forming unit corresponds to the image forming apparatus 101 and the sheet stacking device corresponds to a discharge apparatus, information representing the outer appearance, structure, and size of each of the image forming apparatus 101 and the sheet discharge apparatus, and the outer appearance, structure, and size as a whole during connection is referred to as the apparatus display information 132. For example, in the following, it is assumed that three sheet discharge apparatus are connected to the image forming apparatus 101 in a daisy-chain configuration. In this case, the apparatus display information 132 represents a mode in which the sheet discharge apparatus adjacent to the image forming apparatus 101 is arranged as the first sheet discharge apparatus, and then the second sheet discharge apparatus and the third sheet discharge apparatus are sequentially arranged. The apparatus display information 132 is determined based on the combination of the connected sheet discharge apparatus. The sheet discharge apparatus is arranged to be replaceable with other sheet discharge apparatus. Therefore, the apparatus display information 132 is updated to new information as appropriate.

The stack state information 133 is one type of second information representing a stack state of sheets having images formed thereon in each sheet stacking device, and is referred to when a sheet bundle image to be described later is generated. In this embodiment, the sheet having an image formed thereon is, in some cases, referred to as "sheet". Further, in some cases, two or more stacked sheets, or a bundle of two or more sheets is referred to as "sheet bundle".

The stack state information 133 includes information representing the shape and the size of the sheet or the sheet bundle, which is required for generating the sheet bundle image to be described later. This information is updated in real time every time a detection result of a stacking state detected by a detection device to be described later is received. The "stack state" herein refers to presence or absence of a sheet at a sheet stacking portion (including the change in portion at which the sheets are stacked), and the transition of the outer shape and the size of the sheet and the sheet stacking height, that is, refers to all the changes in sheet state until the sheets are collected from an area in which the sheet is stacked.

Next, the sheet discharge apparatus to be connected to the sheet discharge apparatus connection port 123 of the image forming apparatus 101 is described. Each sheet discharge apparatus refers to a large-capacity stacker and a finisher, and is an apparatus capable of being combined or replaced afterwards. Each sheet discharge apparatus operates as a sheet stacking device capable of stacking and collecting the sheets for each image forming job. That is, each sheet discharge apparatus stacks sheets corresponding to a processed job onto the sheet stacking portion to achieve a sheet bundle of each image forming job.

Figure 2:
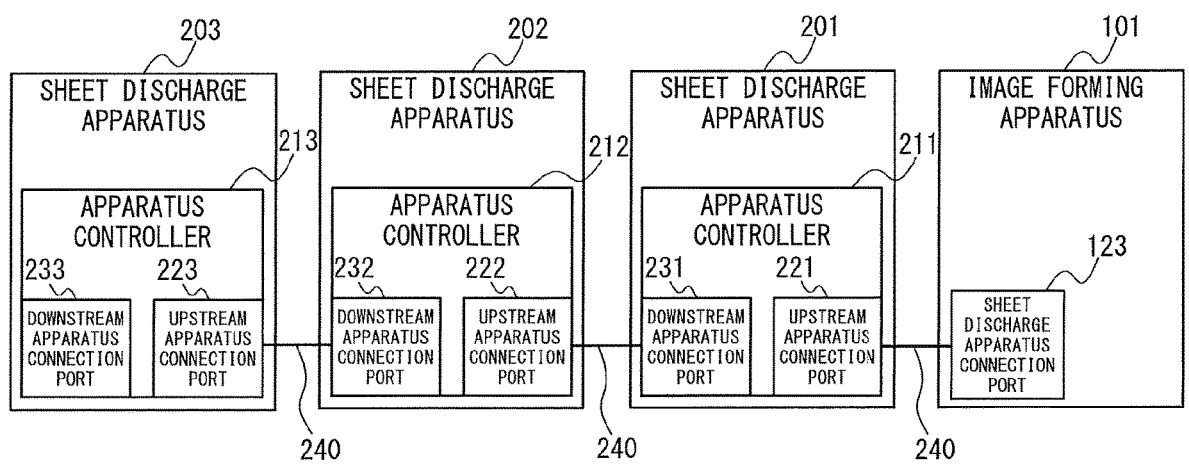
FIG. 2 is a schematic diagram for illustrating a state in which sheet discharge apparatus is connected to an image forming apparatus.

FIG. 2 is a schematic diagram for illustrating a connection example in a case in which three sheet discharge apparatus 201 to 203 are connected to the sheet discharge apparatus connection port 123 in a daisy-chain configuration. The sheet discharge apparatus 201 to 203 include apparatus controllers 211, 212, and 213, respectively, for controlling the operation of its own apparatus. The apparatus controllers 211, 212, and 213 include upstream apparatus connection ports 221, 222, and 223 and downstream apparatus connection ports 231, 232, and 233, respectively. Each of the upstream apparatus connection ports 221, 222, and 223 is a port for connecting to an apparatus upstream of its own apparatus via a communication cable 240. Each of the downstream apparatus connection ports 231, 232, and 233 is a port for connecting to an apparatus downstream of its own apparatus via the communication cable 240. In this manner, the image forming apparatus 101 and the three sheets discharge apparatus 201, 202, and 203 can communicate with each other. The third sheet discharge apparatus 203 may be omitted, or another apparatus that can communicate with the image forming apparatus 101 may be connected downstream of the third sheet discharge apparatus 203.

Figure 3:
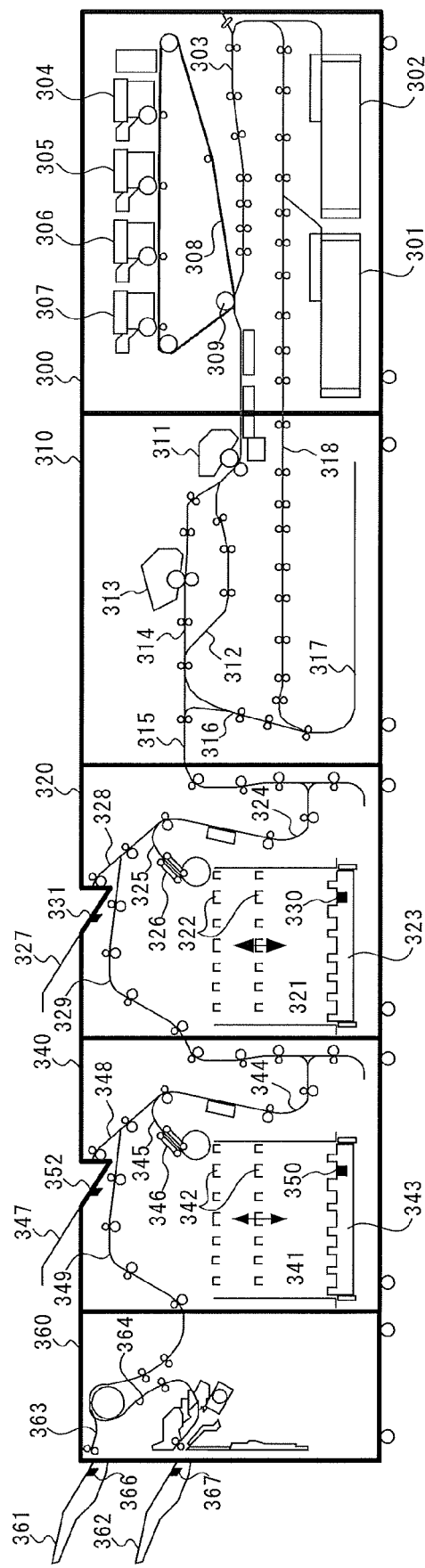
FIG. 3 is a sectional view for illustrating conveyance mechanisms of the image forming system.

Each of the image forming apparatus 101 and the sheet discharge apparatus 201, 202, and 203 includes a sheet conveyance mechanism as a mechanical element. FIG. 3 is an explanatory view for illustrating those conveyance mechanisms. In FIG. 3, an image forming unit 300 is a unit configured to form an image to be transferred onto a sheet, and corresponds to the image forming portion 124 in FIG. 1. An image fixing unit 310 is a unit configured to fix the transferred image. Two large-capacity stackers 320 and 340 and one finisher 360 are connected to the image fixing unit 310 in a daisy-chain configuration.

In the image forming unit 300, each of sheet feeding decks 301 and 302 separates one uppermost sheet among the received sheets to convey the sheet to a sheet conveyance path 303. Development stations 304 to 307 use toner having colors of yellow (Y), magenta (M), cyan (C), and black (K) to cause adhesion of toner images. The adhering toner images are primarily transferred onto an intermediate transfer belt 308. The intermediate transfer belt 308 rotates, for example, clockwise to convey the sheet to a secondary transfer position 309. At this time, the toner images are transferred onto the sheet conveyed through the sheet conveyance path 303. The sheet having the toner images transferred thereon is conveyed to the image fixing unit 310.

In the image fixing unit 310, a fixing unit 311 melts and pressurizes the toner images to fix the toner images onto the sheet. The sheet that has passed through the fixing unit 311 is conveyed from a sheet conveyance path 312 to a sheet conveyance path 315. Additional heating and pressurization may be required depending on the sheet type. In this case, after the sheet passes through the fixing unit 311, the sheet is conveyed to a second fixing unit 313 using a sheet conveyance path in the stage subsequent to the fixing unit 311. The sheet subjected to additional heating and pressurization is conveyed to a sheet conveyance path 314. A reversing portion 316 reverses the conveyed sheet by a switch-back method. When an image is formed on one side of the sheet, the reversed sheet, that is, the sheet having an image formed thereon, is conveyed to the sheet conveyance path 315. When images are formed on both sides of the sheet, the sheet is conveyed to a duplex reverse path 317, and is reversed to be conveyed to a duplex conveyance path 318. In this manner, an image is formed on the second side at the secondary transfer position 309, and the sheet is conveyed to the sheet conveyance path 315. The sheet that has passed through the sheet conveyance path 315 passes through a sheet conveyance path 324 to be input to the large-capacity stacker 320.

The large-capacity stacker 320 includes a stacking portion 321 including a lift tray 322 and an ejection tray 323, which are each configured to stack sheets. Those trays are controlled by the apparatus controller 211 illustrated in FIG. 2. The lift tray 322 is positioned at a sheet stacking portion having a predetermined height under a state in which no sheets are stacked, and is lowered when the stacking proceeds. The ejection tray 323 is a tray for re-stacking the sheets at a time point at which the lift tray 322 is lowered to a re-stacking position, to thereby eject the sheets to the outside of the apparatus. The lift tray 322 and the ejection tray 323 are formed so that their bars for supporting the sheets are present at alternate positions. Therefore, the sheets on the lift tray 322 can be re-stacked onto the ejection tray 323 without issue.

The sheet passes through the sheet conveyance path 324 and a sheet conveyance path 325 to be conveyed to a sheet discharge unit 326. The sheet discharge unit 326 includes a lower rotary member and an upper rotary member that are configured to nip the sheet, and to discharge the sheet in a flipped manner to the lift tray 322. The action of "discharging the sheet in a flipped manner" refers to an action of discharging the sheet with the front and back sides being reversed so that one of both surfaces of the sheet on a side in contact with the lower rotary member of the sheet discharge unit 326 is turned to become an upper surface on the lift tray 322.

The lift tray 322 is controlled to be lowered by an amount of a height of the stacked sheets as the stacking of the sheets proceeds so that an upper end of the stacked sheets is at a predetermined height. When the lift tray 322 is in a fully-stacked state, the lift tray 322 is lowered to the position of the ejection tray 323. The "fully-stacked state" refers to a state in which the sheets reach a maximum stackable amount of the lift tray 322 and no more sheets can be stacked on the lift tray 322. Then, at a time point at which the lift tray 322 reaches the re-stacking position that is lower than the ejection tray 323, the sheets are re-stacked onto the ejection tray 323. After that, the ejection tray 323 is carried to the outside of the apparatus. In this manner, the sheets are removable. This operation is called "ejecting operation".

The large-capacity stacker 320 further includes a top tray 327. The top tray 327 is one sheet stacking portion mainly used for outputting a sample of the sheets to be stacked on the stacking portion 321. During discharge to the stacking portion 321, one sheet (or one bundle) is output to the top tray 327 as a sample. In this manner, the quality of the image formation can be checked without taking out the sheets stacked in the stacking portion 321. When a sheet is output to the top tray 327, the sheet passes through the sheet conveyance path 324 and a sheet conveyance path 328 to be conveyed to the top tray 327. When a sheet is conveyed to an apparatus on the downstream of the large-capacity stacker 320, the sheet is conveyed through a sheet conveyance path 329.

The ejection tray 323 and the top tray 327 include sheet presence/absence detection sensors 330 and 331, respectively. The sheet presence/absence detection sensors 330 and 331 operate as one type of detection device for detecting the change in the stacking state of the sheets on the tray at every predetermined timing. The controller 121 receives the detection information of the sheet presence/absence detection sensors 330 and 331 in time series, and updates the stack state information 133 in the storage 122 based on the received detection information.

The large-capacity stacker 340 has the same configuration as that of the large-capacity stacker 320. That is, the stacking portion 321 (lift tray 322 and ejection tray 323) of the large-capacity stacker 320 corresponds to a stacking portion 341 (lift tray 342 and ejection tray 343) of the large-capacity stacker 340. Similarly, the sheet conveyance paths 324, 325, 328, and 329 and the sheet discharge unit 326 of the large-capacity stacker 320 correspond to sheet conveyance paths 344, 345, 348, and 349 and a sheet discharge unit 346 of the large-capacity stacker 340, respectively. Further, the top tray 327 and the sheet presence/absence detection sensors 330 and 331 of the large-capacity stacker 320 correspond to a top tray 347 and sheet presence/absence detection sensors 350 and 352 of the large-capacity stacker 340, respectively. Those components are controlled by the apparatus controller 212.

The finisher 360 subjects the conveyed sheet to predetermined post-processing under the control of the apparatus controller 213 illustrated in FIG. 2 based on the function designated by the operator. As an example of the post-processing, in this example, the sheet is subjected to stapling (one-portion or two-portion binding) and punching (two or three holes). The finisher 360 includes two sheet discharge trays 361 and 362 each serving as a sheet stacking portion. To the sheet discharge tray 361, a sheet not to be subjected to post-processing, for example, stapling, is discharged through a sheet conveyance path 363. To the sheet discharge tray 362, a sheet subjected to a finishing function designated by the operator is discharged through a sheet conveyance path 364.

Each of the sheet discharge trays 361 and 362 is configured to be raised or lowered. It is also possible to perform such an operation that the sheet discharge tray 361 is lowered so that a plurality of sheets subjected to post-processing are stacked onto the sheet discharge tray 361. The sheet discharge trays 361 and 362 include sheet presence/absence detection sensors 366 and 367, respectively, which are each configured to detect the stacking state of the sheets on the tray. The sheet presence/absence detection sensors 366 and 367 also operate as one type of detection device for detecting the change in the stacking state of sheets on the tray at every predetermined timing. The detection results (detection information) are transmitted to the image forming apparatus 101 in time series by the apparatus controllers (see FIG. 2) included in the large-capacity stackers 320 and 340.

Next, description is given of the sheet stacking state in the large-capacity stacker 320 with reference to FIG. 4A to FIG. 4G. In each drawing, a right side as viewed from an observer corresponds to a sectional view in which the mechanical elements of the large-capacity stacker 320 are viewed from the front side, and a left side as viewed from the observer corresponds to a sectional view in which the mechanical elements of the large-capacity stacker 320 are viewed from the left lateral side. The large-capacity stacker 340 has a similar configuration, and hence the large-capacity stacker 320 is described as a representative stacker.

Figure 4A:
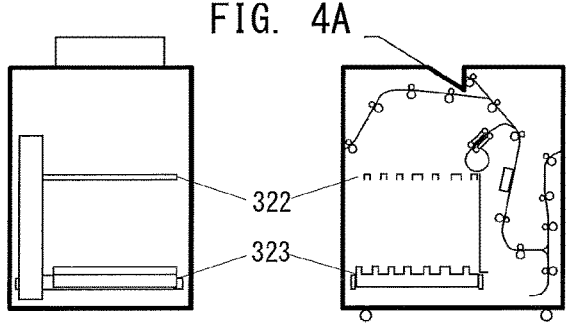
FIG. 4A, FIG. 4B, FIG. 4C, FIG. 4D, FIG. 4E, FIG. 4F, and FIG. 4G are schematic views for illustrating a process of an ejecting operation.

FIG. 4A is an illustration of a state in which no sheets are stacked on the large-capacity stacker 320. The lift tray 322 is raised and stopped at a predetermined height, that is, at a position of a sheet discharge port for discharging the sheets to the stacking portion 321. The ejection tray 323 is accommodated in the apparatus. FIG. 4B is an illustration of a state during an image forming operation. As the stacking of the sheet proceeds, the apparatus controller gradually lowers the lift tray 322 so that the height of the uppermost surface of the stacked sheets matches the position of the sheet discharge port of the stacking portion 321. FIG. 4C is an illustration of a state in which a fully-stacked state of the lift tray 322 is detected. When the lift tray 322 is in the fully-stacked state, stacking onto the lift tray 322 cannot be continued anymore. Therefore, the apparatus controller starts control of re-stacking the stacked sheets onto the ejection tray 323. FIG. 4D is an illustration of a state in which the lift tray 322 is lowered to the re-stacking position of the ejection tray 323 and the sheets are re-stacked onto the ejection tray 323. Even when the lift tray 322 is lowered to the same height as that of the ejection tray 323, the bars for supporting the sheets are located at alternate positions, and hence the bars do not interfere with each other. At a time point at which the lift tray 322 reaches the re-stacking position that is lower than the ejection tray 323, there is obtained a state in which the sheets stacked on the lift tray 322 are re-stacked onto the ejection tray 323.

Figure 4E:
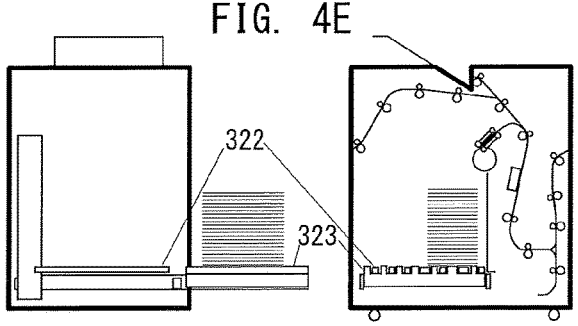
Figure 4B:
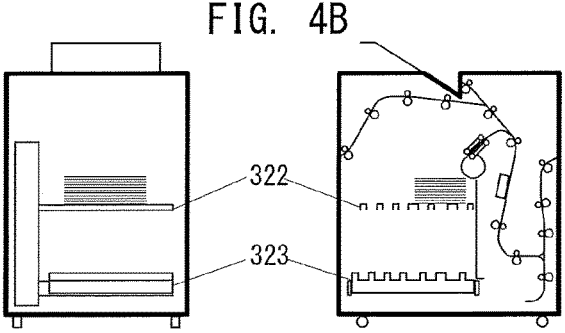
Figure 4F:
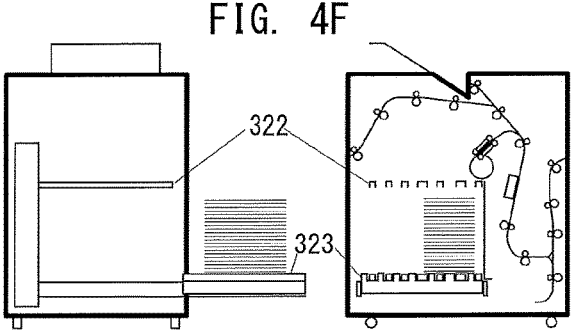
Figure 4C:
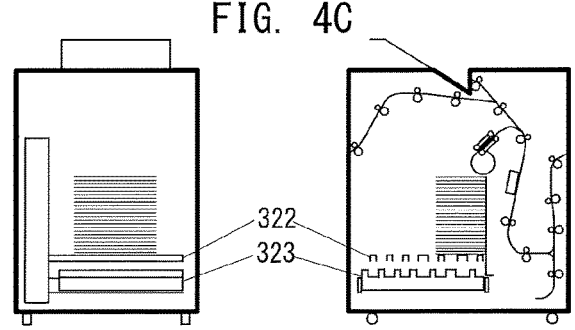
Figure 4G:
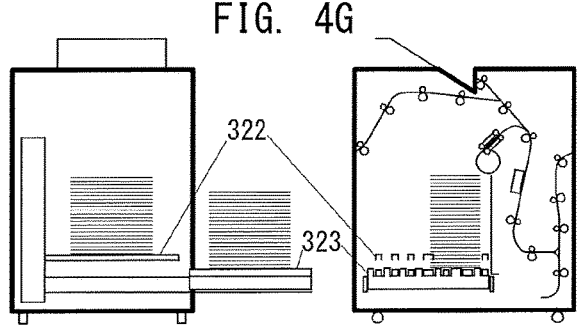
Figure 4D:
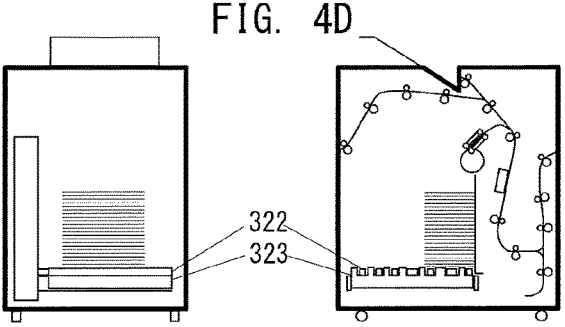

FIG. 4E is an illustration of a state in which the ejection tray 323 having the sheets stacked thereon is ejected to the outside of the apparatus. When the ejection tray 323 is ejected as described above, the stacked sheets become collectable. FIG. 4F is an illustration of a state in which, under a state in which the ejection tray 323 is ejected, the lift tray 322 is raised again to the position at which the subsequent sheets are stacked thereon. In this manner, sheets can be stacked on the lift tray 322. FIG. 4G is an illustration of a state in which, after the image formation is continued under a state in which the ejection tray 323 is ejected, the fully-stacked state of the lift tray 322 is detected. In this state, the ejection tray 323 is ejected, and hence the sheets stacked on the lift tray 322 cannot be re-stacked onto the ejection tray 323. The sheets stacked on the ejection tray 323 are required to be collected to continue the stacking in the large-capacity stacker 320.

Figure 5:
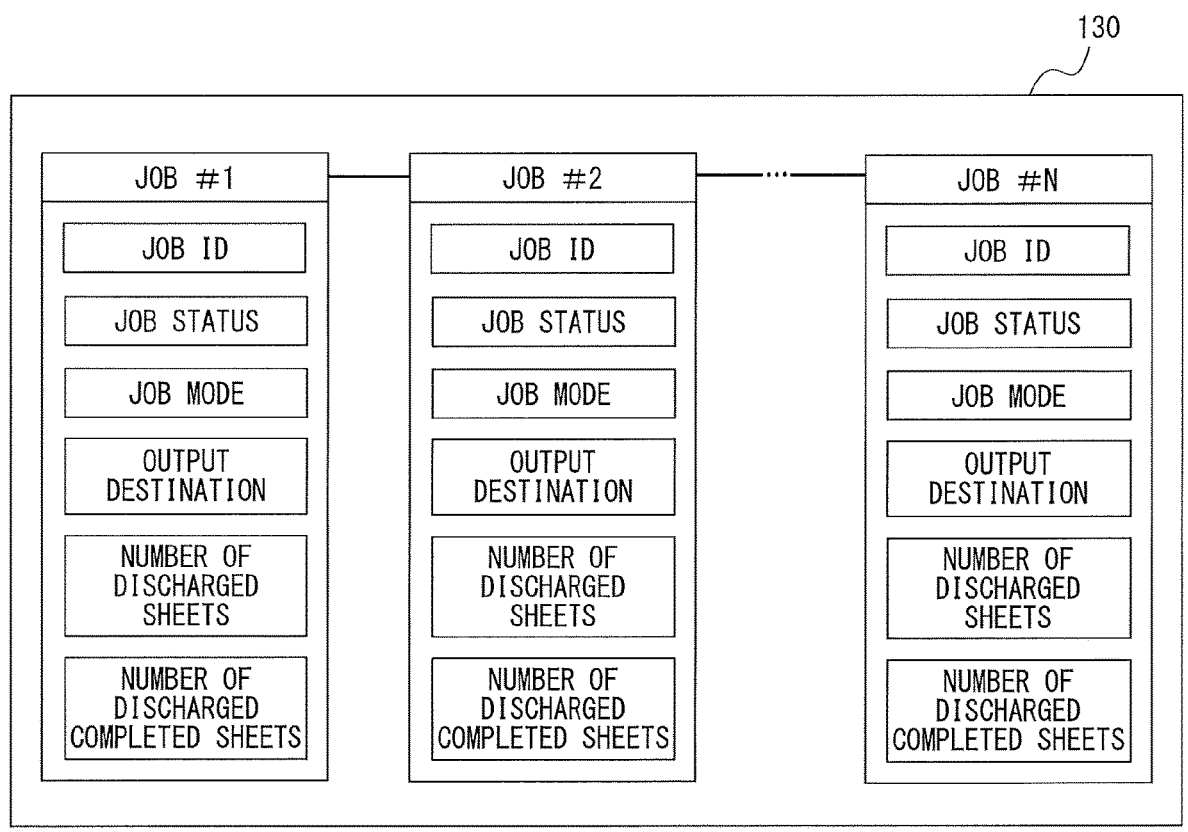
FIG. 5 is an explanatory diagram of job data.

FIG. 5 is an exemplary diagram of job data 130. In this embodiment, job information of an image forming job which is stored in the storage 122 by the controller 121 and is being executed in the image forming apparatus 101 is held. Further, the job information is allowed to be referred by the controller 121. The job data 130 have list-type data structure. The job information is stored in a list of the job data 130 in the order the image forming job is input to the image forming apparatus 101. The job information is deleted from the list when the image forming job is completed.

The job ID is a variable which represents an ID of the image forming job. A unique ID is assigned to each image forming job by the image forming apparatus 101, and the ID is recorded in a member variable. The job status is a variable which represents a status of the image forming job. The state is a state of the job from input of the image forming job to the image forming apparatus 101 until completion of the job. For example, the state may represent that the image is being developed, stand-by time for image forming, or the image is being formed, and the like. The job mode is a variable which represents an image forming configuration which is set for the image forming job. It is collectively represented in FIG. 5 as "job mode", and, in the variable, a plurality of image forming configurations are managed by a structure or the like. The image forming configuration includes, for example, finishing configurations such as stapling and punching, layout configurations such as double-sided print, a configuration of a type of a sheet on which an image is formed. An output destination is a variable which represents a discharge destination, that is, a discharge tray of a discharge apparatus which discharges a sheet on which the image is formed. The discharge trays are a discharge tray (top tray or lift tray) of the large-capacity stackers 320, 340 and a discharge tray (upper tray or lower tray) of the finisher 360 and the like. In this embodiment, the image forming job may designate a discharge tray and discharge a sheet to the same, or designate a discharge apparatus such as the large-capacity stacker 320, 340 or the finisher 360 to automatically discharge a sheet to a most desired discharge tray. The number of output sheets is the same as the present number of sheets on which an image is formed. The number of discharged sheets is calculated based on the number of images needed for the image forming job, a layout configuration such as double-sided print of the job mode, and a type of sheet, or the like. The number of discharged completed sheets is a variable which represents the number of sheets actually discharged to the discharge trays of the large-capacity stackers 320, 340 and the discharge trays (upper tray or lower tray) of the finisher 360. The difference between the number of output sheets and the number of discharged sheets is the number of sheets to be discharged thereafter.

Figure 6:
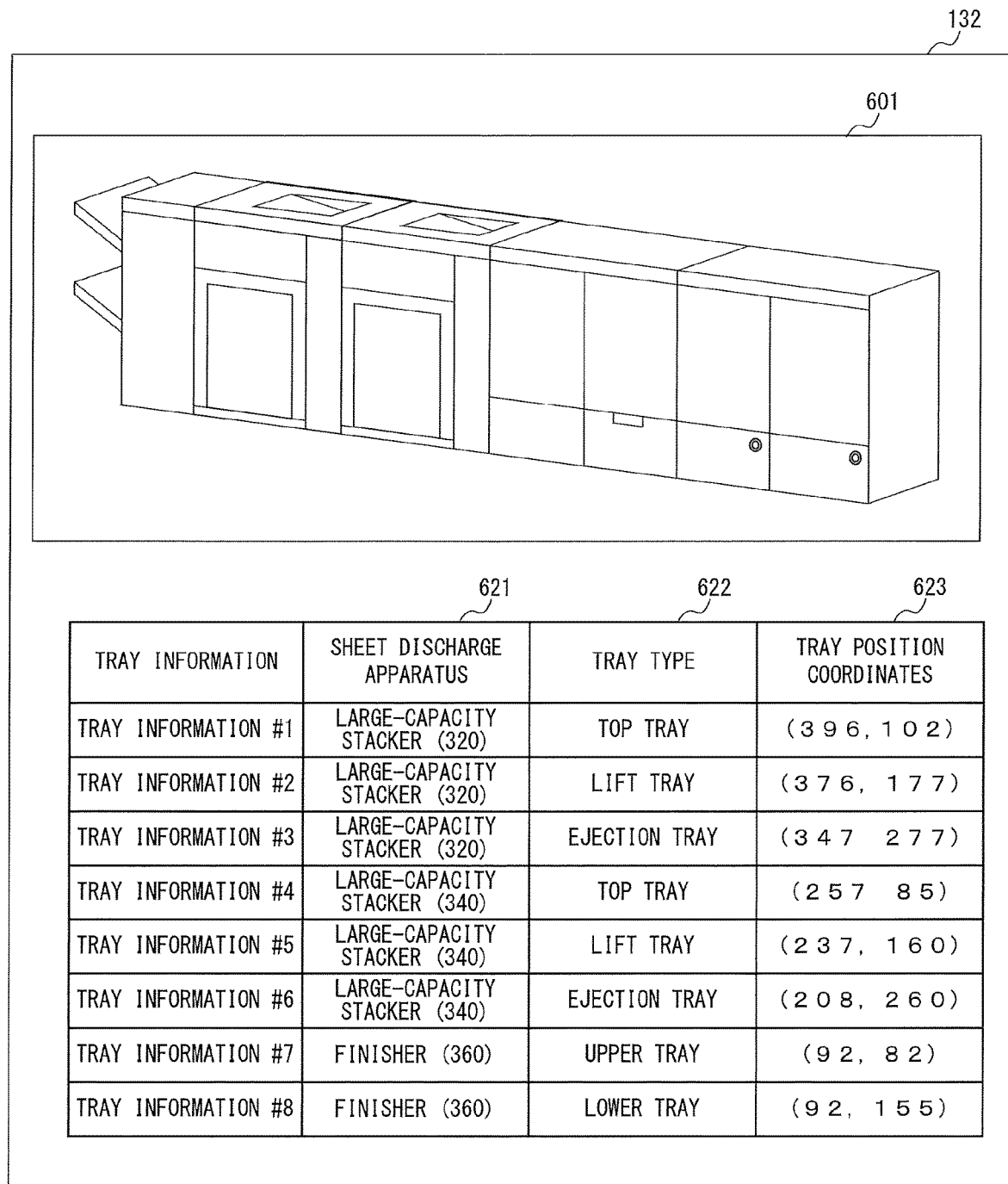
FIG. 6 is a diagram of apparatus configuration information.

FIG. 6 is an exemplary diagram of a monitor screen displayed on the display 113 of the information processing apparatus 100 in a case where the image forming job is performed in the image forming apparatus 101. A display content of the monitor screen is generated by the controller 111 based on the apparatus display information 132 received from the image forming apparatus 101. Alternatively, the controller 121 of the image forming apparatus 101 may generate the display content and the information processing apparatus 100 may receive the display content.

The content of the apparatus display information 132 differs depending on the combination of the sheet discharge apparatus. In the present embodiment, for the sake of convenience of description, it is assumed that the apparatus display information 132 corresponding to all combinations of mountable sheet discharge apparatus is stored in advance. As an example, description is given of an example of the apparatus display information 132 corresponding to the arrangement mode exemplified in FIG. 3. A schematic diagram is used in FIG. 6, but the actual apparatus display information 132 is stored in a form of an extensible markup language (XML) or comma-separated values (CSV), for example.

The upper stage of FIG. 6 represents a whole system image 601 that visualizes the entire arrangement mode by expressing the entire arrangement mode in, for example, a bitmap format, and the lower stage of FIG. 6 represents a table in which information on the position of the sheet discharge tray included in each sheet discharge apparatus is stored. The whole system image 601 can be displayed as a two-dimensional image or a three-dimensional image, but is displayed as a three-dimensional image in this case. A sheet or a sheet bundle is not drawn in the whole system image 601 illustrated at the upper stage of FIG. 6; however, when a sheet is conveyed, a whole system image of the sheet discharge tray at the stacking portion for the sheet is also displayed. For example, there is displayed a whole system image including a structure image representing a lift tray and an ejection tray that is displaced in the above-mentioned large-capacity stackers 320 and 340. In the example illustrated in FIG. 3, each of the large-capacity stackers 320 and 340 includes three sheet discharge trays (top tray, lift tray, and ejection tray), and the finisher 360 includes two sheet discharge trays (upper tray and lower tray). Therefore, in such an arrangement mode, a total of eight sheet discharge trays are usable. In the whole system image 601 at the upper stage of FIG. 6, an actual arrangement mode and structure images of those sheet discharge apparatus and sheet discharge trays are displayed. Therefore, the operator can intuitively recognize which sheet discharge tray the sheets are stacked on and whether the sheets are collectable.

In the table shown at the lower stage of FIG. 6, each of records of trays #1 to #8 corresponds to a sheet discharge apparatus 621 to which each tray is installed, a tray type 622, and tray position coordinates 623. That is, "tray #1" is the top tray of the large-capacity stacker 320. In FIG. 6, it is provided at tray position coordinates (396, 102) with reference to the whole system image 601. The tray position coordinates are offset values (pixel numbers) in a right direction and a lower direction with the upper left of the whole system image 601 serving as an origin. Other trays #2 to #8 have similar content.

Figure 7:
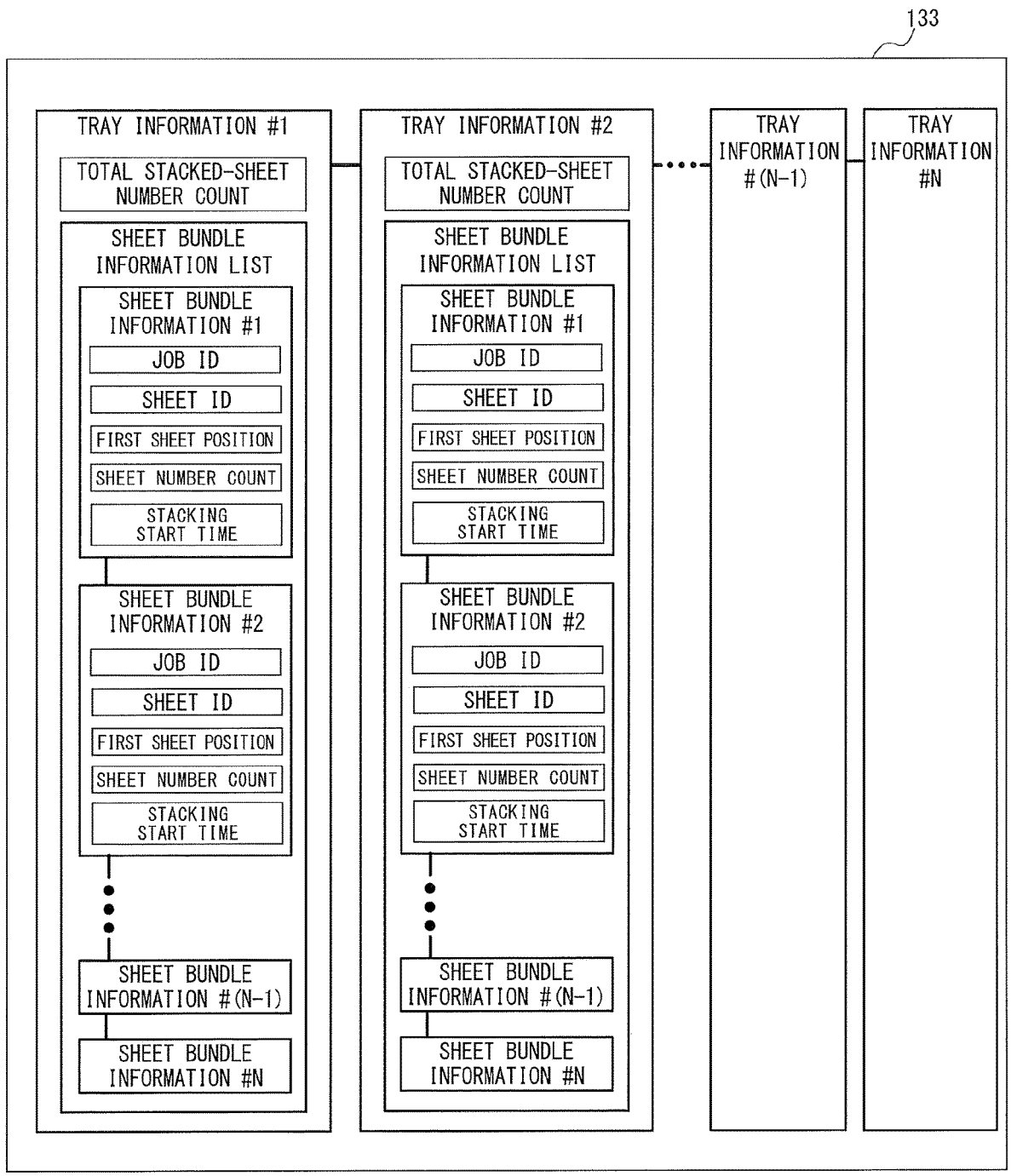
FIG. 7 is a diagram of sheet stack state information.

FIG. 7 is a diagram of the stack state information 133. The stack state information 133 is stored in the storage 122 by the controller 121, and is updated at a timing at which the detection result of the stacking state in each sheet discharge tray is received, for example. Further, the stack state information 133 can be referred to by the controller 121 as appropriate. The stack state information 133 has a list-type data structure. That is, tray information representing the stacking state of the usable sheet discharge tray for each tray is represented as tray information #1 to tray information # N. In the relationship with the table shown at the lower stage of FIG. 6, the detection result of the stacking state in the tray #1 corresponds to the tray information #1. The same applies to the tray information #2, the tray information #(N−1), and the tray information # N. N is a natural number, and N is 8 in the case of the arrangement mode illustrated in FIG. 3.

In FIG. 7, the tray information #1 to the tray information #8 are in a data format having a total stacked-sheet number count (stacking amount information) and a sheet bundle information list as member variables. The total stacked-sheet number count is a variable for counting a total number of sheets stacked on the sheet discharge tray. In the sheet bundle information list, pieces of sheet bundle information, which is attribute information of each sheet bundle, are arranged in a list in the stacking order of the sheets. When no sheets are stacked on any sheet discharge tray, the sheet bundle information list is an empty list. Each piece of sheet bundle information has, as member variables, a job ID, a sheet ID, a first sheet position, a sheet number count and a stacking start time. The job ID is a variable representing an ID of an image forming job corresponding to the sheet bundle. Each image forming job is allocated with a unique ID by the image forming apparatus 101, and the ID is stored in the member variable. The sheet ID is a variable representing an ID of the sheet corresponding to the sheet bundle. The sheet is defined based on characteristics such as a size, a basis weight, and states of the front and back surfaces, and a sheet ID allocated for identifying the sheet is recorded in the member variable. The first sheet position is a variable representing what number the first sheet of the sheet bundle corresponds to when counted from the first sheet stacked on the sheet discharge tray. The sheet number count is a variable for counting the total number of sheets of the sheet bundle. The stacking start time is a valuable which represents a time at which the first sheet of the sheet bundle is discharged.

Figure 8:
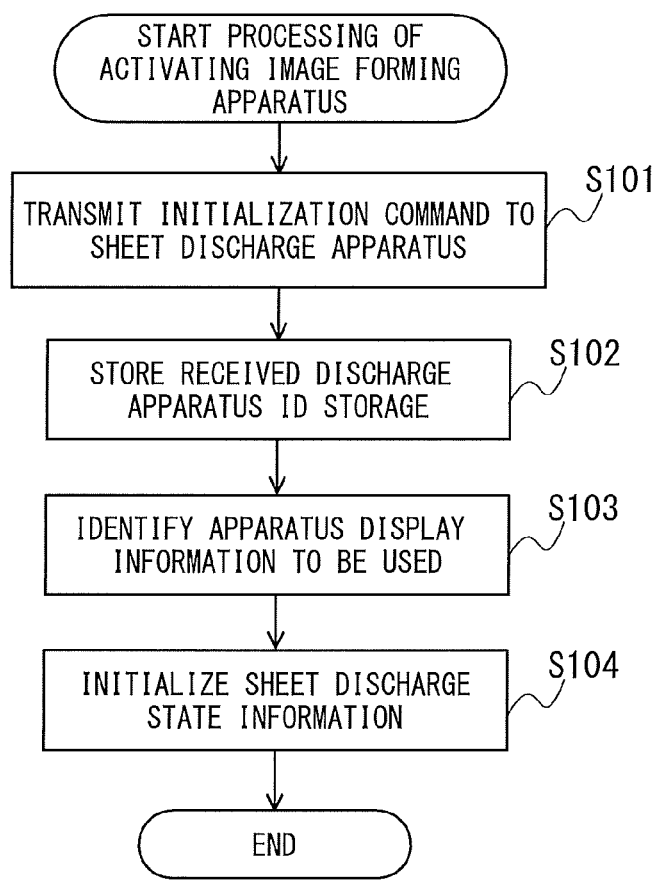
FIG. 8 is a flow chart for illustrating an operation procedure at the time when the image forming apparatus is activated.

Next, an operation example of the image forming system 1 in the first embodiment is described. First, the operation example of the image forming apparatus 101 at the time of activation thereof is described with reference to FIG. 8. FIG. 8 is a control flow chart for illustrating the operation to be executed when the image forming apparatus 101 is activated. This control flow chart is executed by the controller 121 controlling each portion in the image forming apparatus 101. When the image forming apparatus 101 is activated, the controller 121 transmits an initialization command to all of the connected sheet discharge apparatus (Step S101). The initialization command is transmitted, via a communication cable, to each discharge apparatus. Upon receiving the initialization command, each discharge apparatus transmits a sheet discharge apparatus ID for identifying the type of the apparatus itself to the image forming apparatus 101.

The controller 121 stores the received sheet discharge apparatus ID in the storage 122 (Step S102). With the sheet discharge apparatus ID, it can be recognized how the sheet discharge apparatus connected to the image forming apparatus 101 is currently arranged, etc. The controller 121 should identify the apparatus display information 132 corresponding to the arrangement mode of the currently-connected sheet discharge apparatus based on the stored sheet discharge apparatus ID from the apparatus display information 132 stored in advance in accordance with the combination of the sheet discharge apparatus (Step S103). For example, in the apparatus configuration illustrated in FIG. 3, the apparatus display information 132 corresponding to the configuration in which two large-capacity stackers and one finisher are connected is identified.

After the apparatus display information 132 is identified, the controller 121 initializes the stack state information 133 (Step S103). That is, the stack state information 133 is newly generated based on the discharge apparatus ID stored in Step S102. Sheets are not stacked yet on any sheet discharge tray immediately after the image forming apparatus 101 is activated. Therefore, in each piece of tray information of the stack state information 133, the total stacked-sheet number count is 0, and the sheet bundle information list is an empty list.

Figure 9:
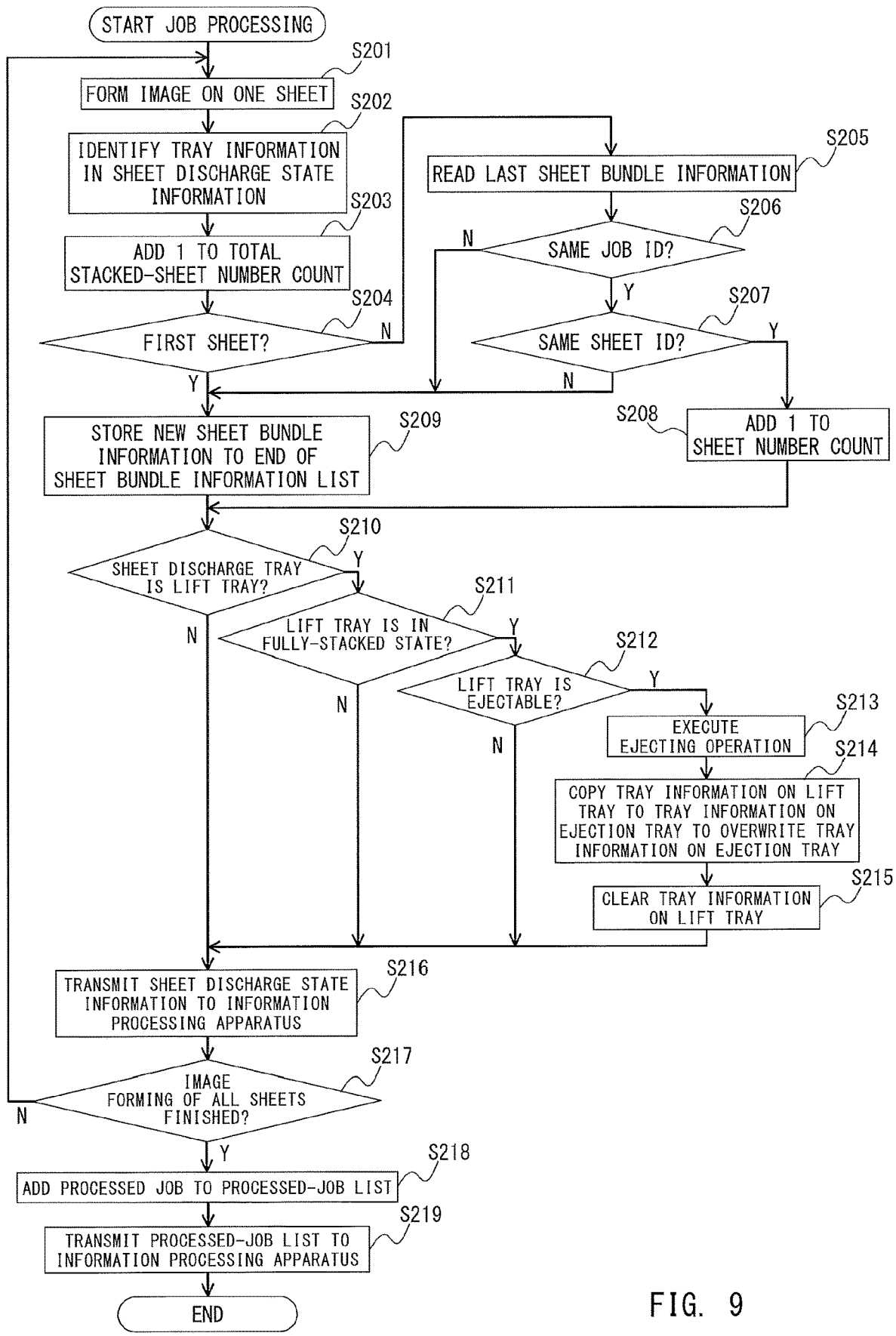
FIG. 9 is a flow chart for illustrating an operation procedure at the time when an image forming job is processed.

Next, with reference to FIG. 9, description is given of an operation example at the time when the image forming job is processed in the image forming apparatus 101. It is assumed that the image forming job is received from, for example, the information processing apparatus 100. The image forming job includes designation of tray information on the sheet stacking portion, that is, the sheet discharge apparatus to which a sheet having an image formed thereon is stacked. In the following description, for the sake of convenience, it is assumed that the tray information on the large-capacity stacker 320 is designated. FIG. 9 is a control flow of the image forming apparatus 101 at this time. This control flow is also executed by the controller 121 integrally controlling the respective portions of the apparatus.

In the image forming apparatus 101, image formation of one sheet is performed in the order of pages in accordance with the image forming job (Step S201). After the image formation, the conveyance of the sheet toward the large-capacity stacker 320 designated by the image forming job is started (Step S201). At this time, the controller 121 identifies the tray information on the designated large-capacity stacker 320 (Step S202). The tray information can be identified by referring to the apparatus display information 132 determined based on the apparatus configuration. For example, tray #1 of the tray information of the table at the lower stage of FIG. 6 is referred to. Tray #1 corresponds to the top tray of the large-capacity stacker 320. Similarly, tray #2 corresponds to the lift tray of the large-capacity stacker 320. When tray #2 is identified here, the controller 121 refers to the record of tray #2 as the tray information.

The controller 121 adds 1 to the total stacked-sheet number count of the identified tray information (Step S203). The controller 121 further determines whether or not the discharged sheet is the first sheet in the sheet discharge tray based on the value of the total stacked-sheet number count (Step S204). When the sheet is not the first sheet (Step S204: N), the controller 121 refers to the tray information to read last sheet bundle information in the sheet bundle information list (Step S205). Then, the controller 121 determines whether or not the job ID of the job for which the image formation is performed is the same as the job ID in the sheet bundle information read in Step S205 (Step S206). When the job ID is the same (Step S206: Y), the controller 121 determines whether or not the sheet ID of the sheet subjected to image formation in Step S201 is the same as the sheet ID in the sheet bundle information read in Step S205 (Step S207). When the sheet ID is the same (Step S207: Y), the controller 121 adds 1 to the sheet number count of the last sheet bundle information in the tray information (Step S208), and the processing proceeds to Step S210.

When the sheet is the first sheet in Step S204 (Step S204: Y), when the job ID differs in Step S206 (Step S206: N), and when the sheet ID differs in Step S207 (Step S207: N), the controller 121 executes the processing of Step S209. That is, new sheet bundle information is generated at the end of the sheet bundle information list in the tray information. The member variables of the generated new sheet bundle information are as follows.

First, the job ID is the job ID of the job for which the image formation is performed. The sheet ID is a sheet ID corresponding to the sheet subjected to image formation in Step S201. The total stacked-sheet number count is input as the first sheet position. The sheet number count is 1. A time at which the sheet bundle information is generated is input as the stacking start time. Next, the controller 121 determines whether or not the sheet discharge tray designated in Step S201 is the lift tray of the large-capacity stacker 320 (Step S210). When the sheet discharge tray is the lift tray (Step S210: Y), the controller 121 determines whether or not the lift tray is in the fully-stacked state after sheets are discharged in Step S201 (Step S211). When the lift tray is in the fully-stacked state (Step S211: Y), the controller 121 determines whether or not the lift tray in the fully-stacked state in Step S211 is ejectable (Step S212). Whether the lift tray is ejectable is determined based on whether or not the sheet bundles are stacked on the ejection tray of the same large-capacity stacker. When the sheet bundles are stacked on the ejection tray, that is, when the sheet presence/absence detection sensor 330 or the like detects that the sheet bundles are stacked, the controller 121 determines that the lift tray is not ejectable. Otherwise, the controller 121 determines that the lift tray is ejectable. When the lift tray is ejectable (Step S212: Y), the controller 121 re-stacks the sheet bundles stacked on the lift tray detected to be in the fully-stacked state in Step S211 onto the ejection tray, and executes the ejecting operation (Step S213).

After that, the controller 121 copies, in the stack state information 133, the tray information on the lift tray for which the ejecting operation of the large-capacity stacker 320 is executed in Step S213, to the tray information on the same large-capacity stacker to overwrite the tray information on the same large-capacity stacker (Step S214). Further, the controller 121 clears, in the stack state information 133, the tray information on the lift tray for which the ejecting operation is executed in Step S213 (Step S215). In this case, clearing the tray information refers to obtaining an empty sheet bundle information list by setting the total stacked-sheet number count in the tray information to 0.

In Step S210, when the sheet discharge tray is not the lift tray (Step S210: N), when the lift tray is not in the fully-stacked state (Step S211: N), and when the lift tray is not ejectable (Step S212: N), the controller 121 transmits the stack state information 133 to the information processing apparatus 100 (Step S216). The same is applied after the tray information on the lift tray is cleared (Step S215). After that, the controller 121 determines whether or not the image formation of all of the sheets by the image forming job is finished (Step S217). When the image formation is not finished yet (Step S217: N), the processing returns to Step S201. When image formation of all of the sheets is finished (Step S217: Y), the controller 121 lists up (adds) the image forming job which has been processed (hereinafter "the processed job") to the processed-job list 131 (Step S218). Then, the controller 121 transmits the processed-job list 131 that has been updated based on the addition to the information processing apparatus 100 (Step S219), and the series of processing is ended.

Figure 10:
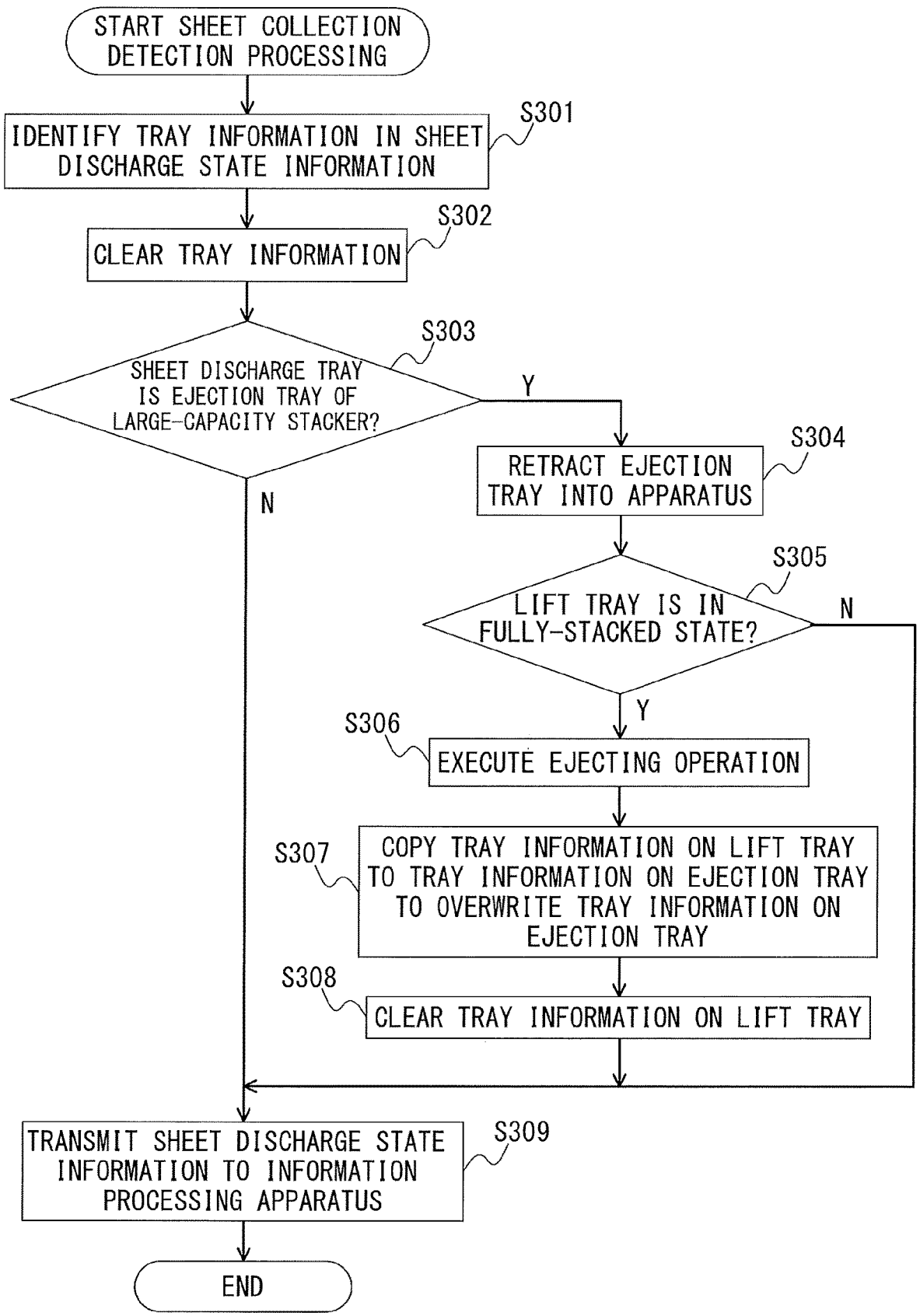
FIG. 10 is a flow chart at the time when sheets are removed from a sheet discharge tray.

Next, with reference to FIG. 10, description is given of an operation when the collection of sheets from the sheet discharge tray is detected in the image forming apparatus 101. In the following, an example in which sheets are collected from the large-capacity stacker 320 is explained. FIG. 10 is a control flow of sheet collection detection processing. This control flow is also executed by the controller 121 integrally controlling the respective portions of the apparatus. The sheet collection is detected when a state in which the sheet presence/absence detection sensors 330 and 331 detect the stacking state of the sheet bundles is changed to a state in which the stacking state is not detected anymore.

The controller 121 refers to the stack state information 133 to identify the tray information corresponding to the sheet discharge tray at which the sheet collection is detected (Step S301). Then, the controller 121 clears the tray information (Step S302). The controller 121 further determines whether or not the sheet discharge tray is the ejection tray 323 of the large-capacity stacker 320 (Step S303). When the sheet discharge tray is the ejection tray 323 (Step S303: Y), the controller 121 retracts the ejection tray 323 into the apparatus (large-capacity stacker 320) (Step S304). Further, the controller 121 determines whether or not the lift tray 322 of the large-capacity stacker 320 at which the sheet collection is detected is in the fully-stacked state (Step S305). When the lift tray 322 is in the fully-stacked state (Step S305: Y), the controller 121 re-stacks the sheets stacked on the lift tray 322 in the fully-stacked state onto the ejection tray 323 to execute the ejecting operation (Step S306). Then, the controller 121 copies, in the stack state information 133, the tray information on the lift tray 322 for which the ejecting operation is executed, to the tray information on the ejection tray 323 of the large-capacity stacker 320 to overwrite the tray information on the ejection tray 323 (Step S307). After that, the controller 121 clears, in the stack state information 133, the tray information on the lift tray 322 for which the ejecting operation is executed (Step S308).

When the sheet discharge tray corresponding to the empty tray information is not the ejection tray 323 (Step S303: N), the controller 121 transmits the stack state information 133 to the information processing apparatus 100 (Step S309), and ends the series of processing. The same processing is performed when the lift tray 322 is not in the fully-stacked state (Step S305: N) and after the tray information on the lift tray 322 is cleared in Step S308.

Figure 11:
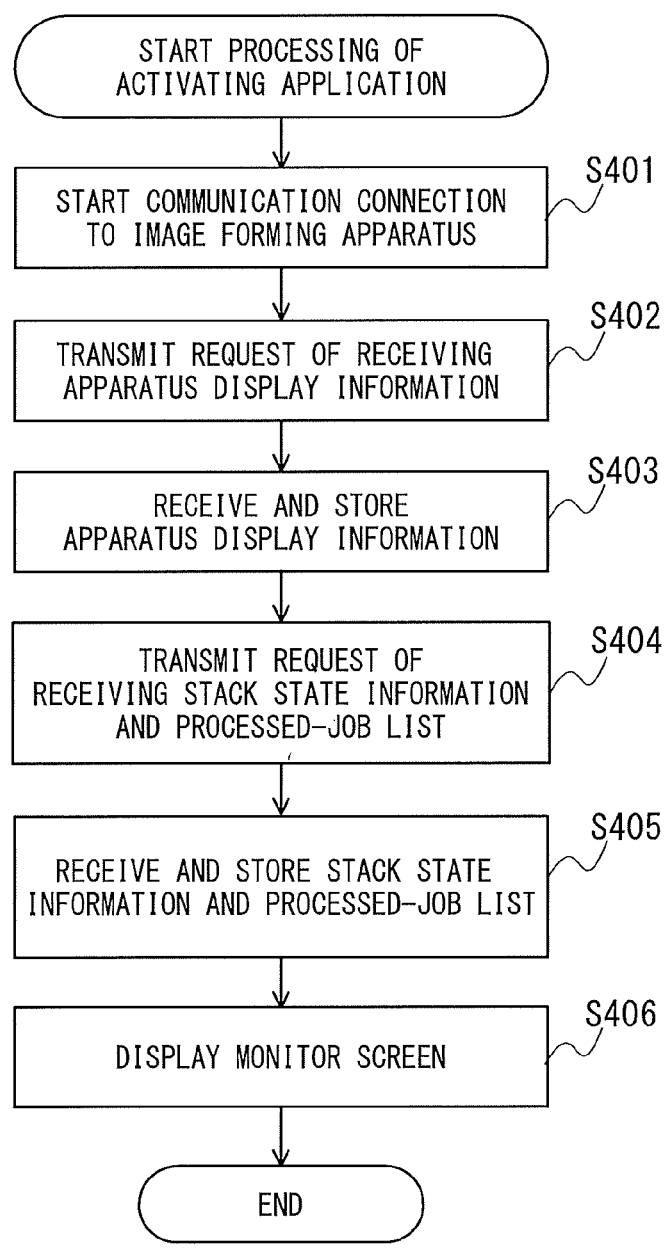
FIG. 11 is a control flow for illustrating an operation procedure of an information processing apparatus.

The operator can recognize the stacking state of each sheet discharge apparatus connected to the image forming apparatus 101 as required by an application executed by the computer program for terminal control in the information processing apparatus 100. The operation of the information processing apparatus 100 at this time is described with reference to FIG. 11. FIG. 11 is a control flow of activation processing of the application. This control flow is executed by the controller 111 integrally controlling the respective portions of the terminal.

When an application is activated in the information processing apparatus 100, the controller 111 starts communication connection to the image forming apparatus 101 (Step S401). The communication connection refers to continuous establishment of a communication path until the operator inputs a clear cancel instruction. When the communication path is established, a request of receiving the apparatus display information 132 is transmitted to the image forming apparatus 101 (Step S402). When the image forming apparatus 101 (controller 121) receives this acquisition request, the image forming apparatus 101 transmits, to the information processing apparatus 100, the apparatus display information 132 corresponding to the current apparatus configuration. When the apparatus display information 132 is updated while the communication connection is established, the image forming apparatus 101 transmits the updated apparatus display information 132 to the information processing apparatus 100. The controller 111 sequentially stores the apparatus display information 132 received from the image forming apparatus 101 to the storage 112 (Step S403).

The controller 111 further transmits a request of receiving the stack state information and the processed-job list to the image forming apparatus 101 (Step S404). When the image forming apparatus 101 (controller 121) receives this acquisition request, the image forming apparatus 101 (controller 121) transmits the stack state information 133 and the processed-job list 131 that are currently stored to the information processing apparatus 100. The controller 111 stores the stack state information 133 and the processed-job list 131 received from the image forming apparatus 101 to the storage 112 (Step S405). Further, the controller 111 generates a monitor screen based on the stored apparatus display information 132, stack state information 133, and processed-job list 131 to display the monitor screen on the display 113 (Step S406).

Figure 12:
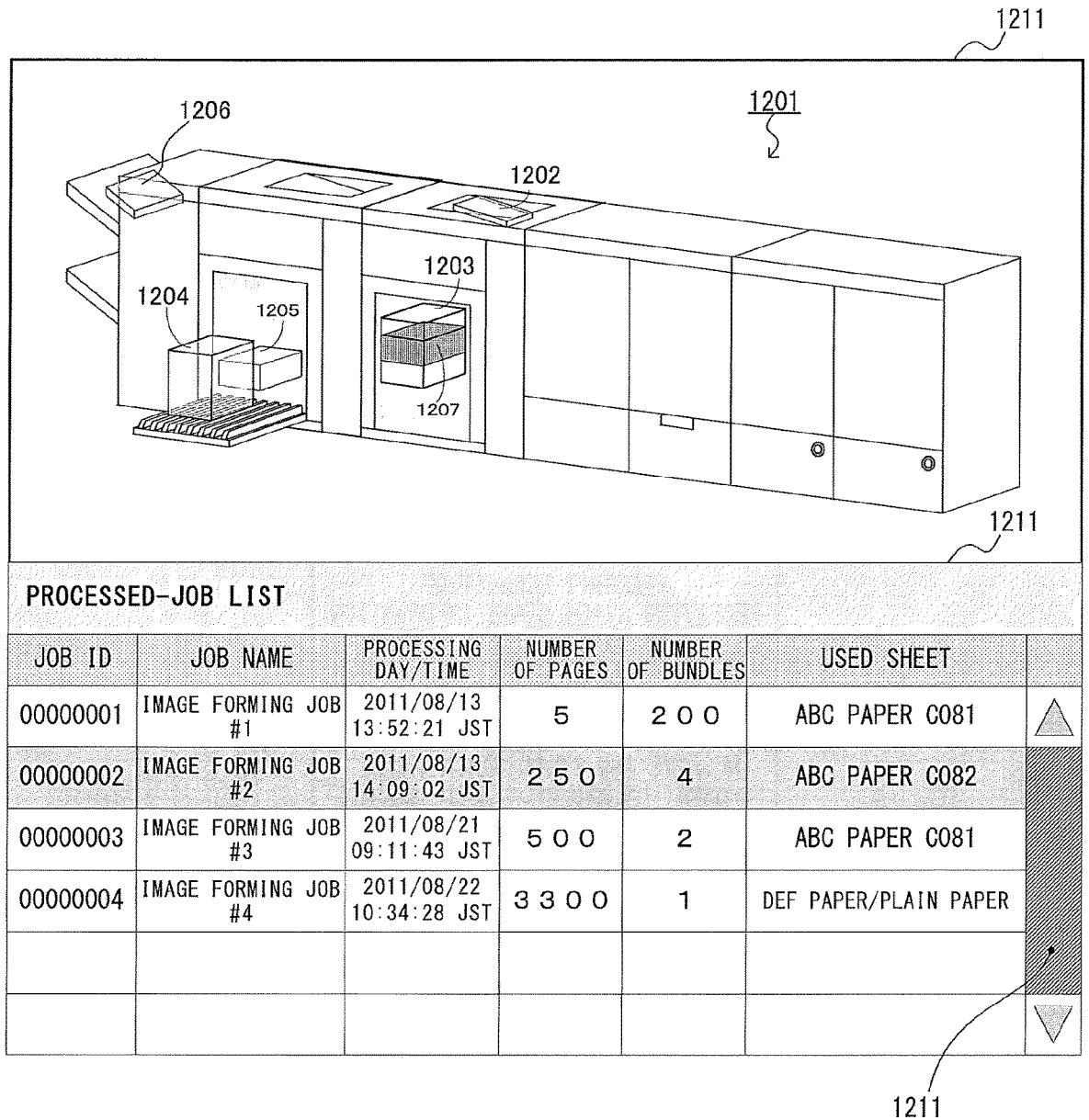
FIG. 12 is a display example of a monitor screen.

An example of a monitor screen is illustrated in FIG. 12. In a monitor screen 1200 exemplified in FIG. 12, an image region 1201 and a list region 1210 are formed. The image region 1201 is a region for visually displaying the whole system image which visualizes an arrangement configuration of the image forming system as a whole and a sheet image which visualizes a stacking state of sheets each having an image formed thereon in the discharge apparatus, and has a two-display-layer structure. That is, the image region 1201 includes a first display layer for displaying the whole system image, and a second display layer for mapping display of a sheet image at the sheet stacking portion of the whole system image on the first display layer.

In the first display layer, the whole system image generated based on the apparatus display information 132 stored in Step S403 is displayed. In the second display layer, based on the stack state information 133 received by the information processing apparatus 100, the sheet image 1202 to 1207 that is visualized in a form corresponding to the stack state in each sheet discharge tray is displayed. The display of the sheet image 1202 to 1207 is updated in real time at a timing at which the change in sheet stacking state is detected. That is, the controller 111 is configured so that a mode of displaying the sheet image 1202 to 1207 on the display 113 can be changed in real time for each image forming job.

The list region 1210 is one embodiment of a list display unit, and the processed-job list received by the information processing apparatus 100 from the image forming apparatus 101 is displayed. In the processed-job list, job attributes (job ID, job name, number of pages, number of bundles, and used sheet) of each processed job are displayed. In the processed-job list, order information is related, in the order of time at which the sheet is discharged, to a sheet bundle corresponding to each tray. The controller 121 allows the sheet image to be displayable according to the order information. Further, the controller 111 allows the designated processed job and the sheet image corresponding to the designated processed job to be displayed such that they can be distinguished from both of the other processed jobs and the sheet images corresponding to the other processed jobs.

The operator can operate the input portion 114 to designate any processed job on the processed-job list. The example of FIG. 12, illustrates that a processed job (job name: image forming job #3) having a job ID of "00000002" is designated. In a case where the sheet of the designated processed-job still remains in the sheet discharge tray, the display of the sheet image in the display area 1201 is switched accordingly so that the position of the same can be found. The sheet corresponding to the processed-job of the designated job ID "00000002" is displayed, as in the sheet image 1207, in a display color different from that of the other sheet images 1202 to 1206. Thereby, the position of the sheet corresponding to the designated processed-job can be easily confirmed.

When the number of processed jobs listed in the processed-job list 131 is larger than the number of jobs that can be displayed at one time in the list region 1210, a scroll bar 1211 is used. The operator can operate the scroll bar 1211 to designate any processed job. The designated processed job is displayed in an emphasized manner (such as highlighted (inverted) manner, etc.,), by the controller 111, to be distinguished from other processed jobs.

Figure 13:
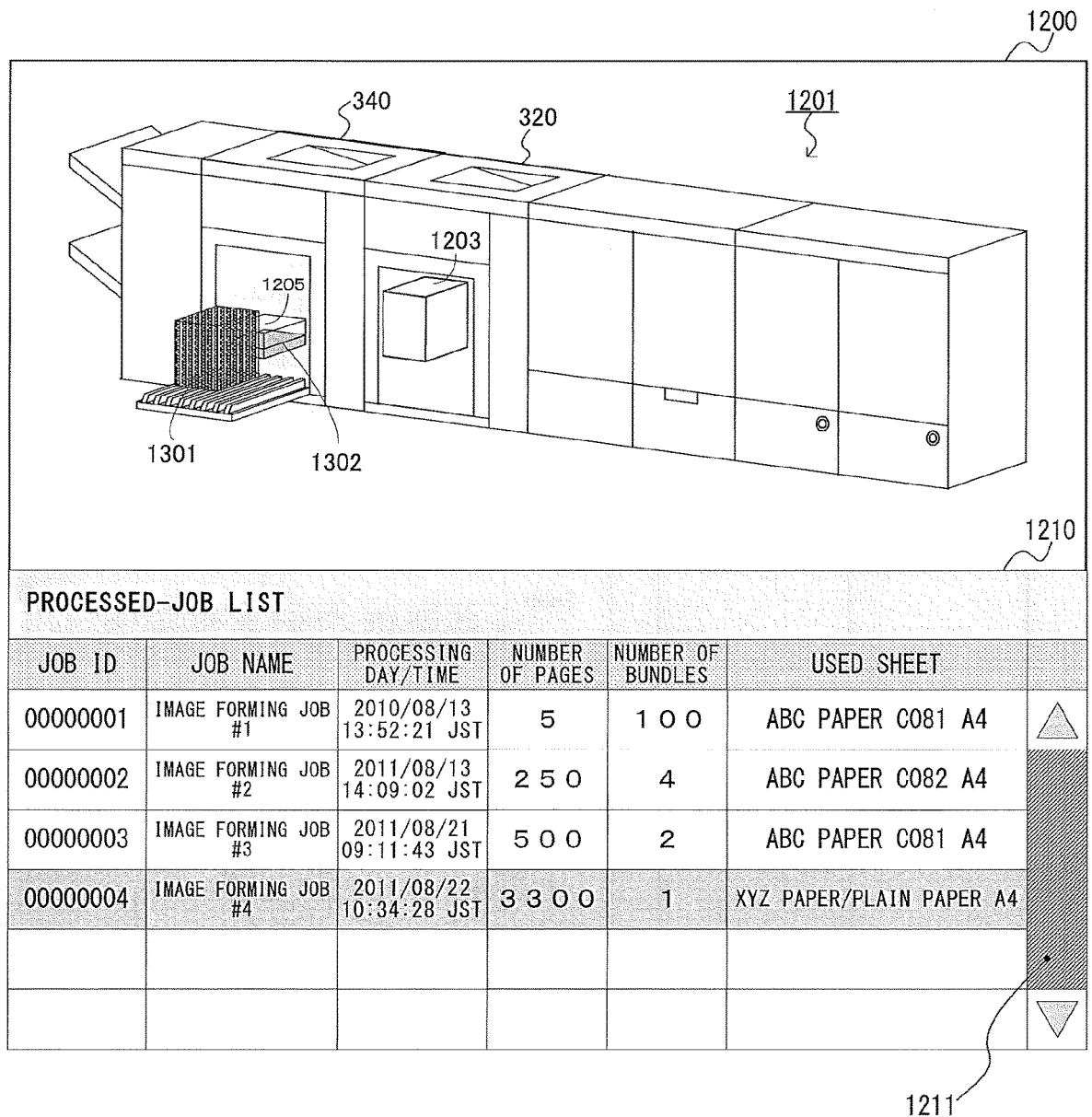
FIG. 13 is a display example of a monitor screen in a case where a sheet bundle cannot be taken out.

FIG. 13 shows an example of the monitor screen in a case where the sheet bundle of the designated processed-job cannot be taken out because the other image forming is currently executed and the sheets thereof are output in the other image forming. In the example of FIG. 13, the processed-job (job name: image forming job #4) of the job ID "00000004" is designated in the processed job list, and each job is highlighted to distinguish it from other processed jobs. In the image forming job #4, the sheet bundle is divided into 1301 and 1302 and stacked on the eject tray and the lift tray of the large-capacity stacker 340. As shown in FIG. 13, on the lift tray of the large-capacity stacker 340, a subsequent (or following) image forming job is in the process of outputting a sheet, and, because the output sheet is stacked on the sheet bundle 1302, the sheet bundle 1205 is stacked on the lift tray.

While the sheets are discharged to the lift tray, the user cannot eject the sheets. Therefore, even if the sheet bundle 1301 of the image forming job #4 is taken out, the sheet bundle 1302 cannot be taken out until the image forming job being processed is completed or the lift tray of the large-capacity stacker 340 is fully stacked. In this example, the processed-job in which at least a part of the sheet bundle cannot be taken out due to the output sheets from the subsequent image forming job is displayed in a color different from the color of the sheet bundle of the designated processed-job. For example, the sheet bundles 1301 and 1302 of processed-jobs which the sheet bundle cannot be taken out, even if designated, are displayed in a color different from the sheet bundle 1207 of the processed-job in which sheet bundle can be taken out shown in FIG. 12. In this example, all the sheet bundles of processed-jobs in which the sheet bundle cannot be taken out are displayed in display colors different from the normal. However, only the sheet bundle which cannot be taken out (for example, the bundle of sheets 1302) may be displayed in a different display color.

Figure 14:
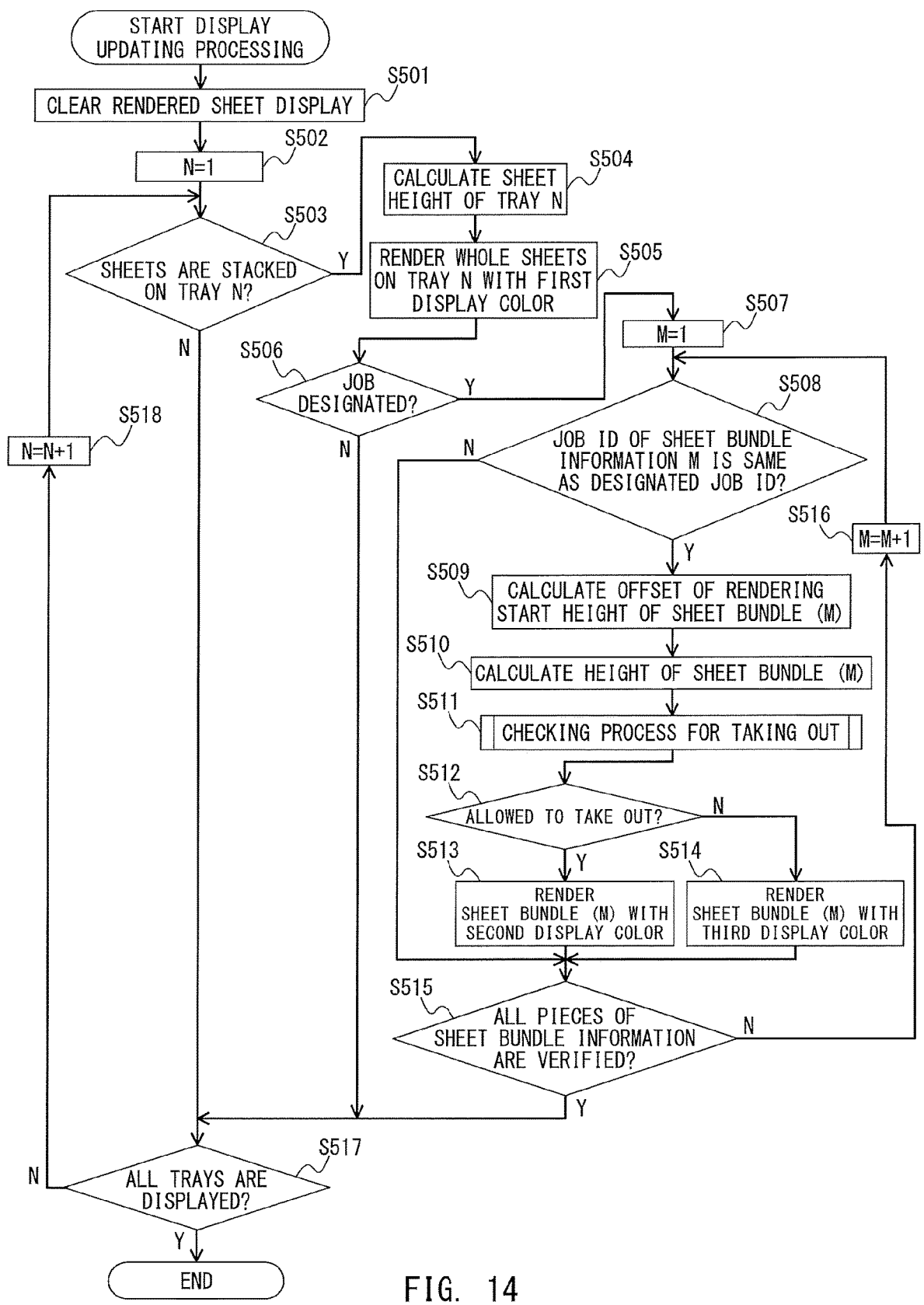
FIG. 14 is a flow chart for illustrating a display update procedure of the information processing apparatus.

Next, description is given of display update process of a case in which the stack state information is received in the image forming apparatus 101, or a case in which the image forming job or processed-job is changed. FIG. 14 is a control flow to be executed by the controller 111 of the information processing apparatus 100 at this time. In FIG. 14, the controller 111 clears (deletes) the display of the sheet bundle image displayed in the second display layer of the image region 1201 (Step S501). The controller 111 substitutes 1 for a variable N representing the stacking order of the sheet discharge tray (Step S502), and then determines whether or not the sheets are stacked on the tray N in the stack state information (Step S503). When the total stacked-sheet number count in the tray information N is 0, it is determined that no sheets are stacked. When the sheets are stacked (Step S503: Y), the controller 111 calculates a height (h1 in FIG. 15A) of the sheet bundle, which corresponds to two or more stacked sheets, stacked on the tray N (Step S504). Thus, when the entire sheet bundle stacked on the tray N is displayed, the pixel of the height of the sheet bundle is calculated. The height or thickness of the sheet bundle is calculated by multiplying the total stacked-sheet number count of the tray information N by a predetermined coefficient P. The coefficient P is a coefficient representing the pixel corresponding to the height of one sheet. When the height of the sheet bundle includes a decimal value as a result of the calculation, the value is rounded up to an integer value.

After the height of the sheet bundle is calculated, the controller 111 renders and displays the sheet bundle image representing the sheet bundle stacked on the tray N with a first display color (Step S505). Then, the controller 111 determines, in the list area, whether or not a job (processed-job) is designated or not (Step S506). When no image forming job is designated (Step S506: N), the processing proceeds to Step S517. When the image forming job is designated (Step S506: Y), the controller 111 substitutes 1 for a variable M representing the order of the sheet bundle information (Step S507). The sheet bundle information M thereafter represents information related to the M-th sheet bundle in the sheet bundle information list of the tray information N of the received stack state information.

The controller 111 then determines whether or not the job ID of the sheet bundle information M is the same as the job ID of the image forming job designated in the list region (Step S508). When the job ID is not the same (Step S508: N), the processing proceeds to Step S515. When the job ID is the same (Step S508: Y), the controller 111 calculates a rendering start height offset (s in FIG. 16A) of the sheet bundle (M) corresponding to the sheet bundle information M (Step S509). The rendering start position height of the sheet bundle is calculated by multiplying the rendering start position of the sheet bundle corresponding to the sheet bundle information M by the above-mentioned coefficient P. When the rendering start position height offset includes a decimal value as a result of the calculation, the value is rounded down to an integer value.

After that, the controller 111 calculates the height of the sheet bundle (M) (Step S510). That is, the controller 111 calculates the pixel corresponding to the height of the sheet bundle (M) when the sheet bundle image is displayed on the display 113. The height of the sheet bundle (M) is calculated by multiplying the sheet number count by the above-mentioned coefficient P. When the height of the sheet bundle (M) includes a decimal value as a result of the calculation, the value is rounded up to an integer value.

After the height of the sheet bundle (M) is calculated, the controller 111 determines whether the sheet bundle (M) can be taken out or not in relation to the sheet discharged by the subsequent image forming job (Step S511: checking process). The details of the flow of this determining processing will be described later with reference to FIG. 17. As a result of determination in Step S511, in a case where it is determined that the sheet bundle (M) can be taken out (S512: Y), the controller 111 renders the portion of the sheet bundle (M) with a second display color which is different from the first display color (Step S513). In this manner, the portion of the sheet bundle (M) corresponding to the designated processed-job is rendered with the second display color and displayed. In a case where it is determined that the sheet bundle (M) cannot be taken out (Step S512: N), the control unit 111 renders the portion of the sheet bundle (M) in a third display color which is different from both of the first and second display colors (Step S514).

The operator can recognize that he or she cannot take out the sheet bundle (M) because the portion of the sheet bundle (M) corresponding to the designated processed job is rendered and displayed in the third display color which is different from the color rendered and displayed in a case where it can be taken out. When the portion of the sheet bundle (M) is drawn in the second or third display color (Steps S513, S514), the controller 111 determines whether or not all pieces of sheet bundle information in the sheet bundle information list of the tray information N have been verified (Step S515). When all pieces of sheet bundle information have been verified (Step S515: Y), the processing proceeds to Step S517. When the verification of all pieces of sheet bundle information is not finished yet (Step S515: N), the controller 111 adds 1 to the variable M (Step S516), and the processing returns to Step S508.

Then, in Step S517, the controller 111 determines whether or not all pieces of tray information in the received stack state information have been displayed. When the display of all pieces of tray information is finished (Step S517: Y), the controller 111 updates the display of the sheet image in the second display layer (Step S519), and the series of processing is ended. When the display of all pieces of tray information is not finished yet (Step S517: N), the controller 111 adds 1 to the variable N (Step S518), and the processing returns to Step S503.

Now, a method of rendering the sheet bundle image to be rendered in Step S505 is described with reference to FIG. 15A to FIG. 15C. In this case, as an example, description is given of a method of rendering the whole sheet bundle on the ejection tray of the large-capacity stacker. A height (h1 of FIG. 15A) of a rendered sheet bundle 1501 is the height of the whole sheet bundle calculated in Step S504. The sheet bundle image 1501 is rendered by seven points of vertex A to vertex G. In a list 1502 of FIG. 15B, which represents a method of calculating the coordinates of each vertex, the vertex A has tray position coordinates (coordinate values thereof are expressed as (x, y)) in the sheet discharge tray. The tray position coordinates of each sheet discharge tray are stored in the apparatus display information 132 stored in Step S403. The coordinate values of other vertices (B to G) are determined by adding or subtracting a predetermined offset value and the sheet height h1 to or from the coordinate values (x, y) of the vertex A.

The sheet bundle 1501 is rendered by a rendering command of, for example, scalable vector graphics (SVG). In FIG. 15C, there is shown an example of a rendering command 1503 of the sheet bundle image 1501 at the time when the SVG is used. The shape of the sheet bundle image 1501 differs depending on the shape of the corresponding sheet discharge tray, but the point that the shape is determined based on the tray position coordinates, the predetermined offset value, and the sheet height is the same.

Next, a method of rendering the sheet image to be rendered in Step S511 is described. In this case, with reference to FIG. 16A to FIG. 16C, a method of rendering the sheet image (the portion of sheet bundle (M)) corresponding to the processed-job designated in the ejection tray of the large-capacity stacker is described. FIG. 16A illustrates a sheet image 1601 which represents a shape and a size of the sheet bundle (M). A height (h2 in FIG. 16A) of a sheet bundle (M) is the height of the sheet bundle (M) calculated in Step S510. The sheet bundle (M) is rendered by seven points of vertex H to vertex N. FIG. 16B illustrates a list 1602. The vertex A corresponds to tray position coordinates (coordinate values thereof are expressed as (x, y)) in the sheet discharge tray. The vertex H is determined based on the vertex A and the rendering start position height offset s of the sheet bundle calculated in Step S509. The coordinate values of other vertices (I to N) are determined by adding or subtracting a predetermined rendering start position height offset value and the sheet height h2 to or from the coordinate values of the vertex H. FIG. 16C illustrates a rendering command of the sheet bundle image 1601 when represented using the SVG. The shape of the sheet bundle image 1401 differs depending on the shape of the corresponding sheet discharge tray, but the point that the shape is determined based on the tray position coordinates, the predetermined offset value, the position to start rendering height of the sheet bundle (M), and the height of the sheet bundle (M) is the same.

Figure 17:
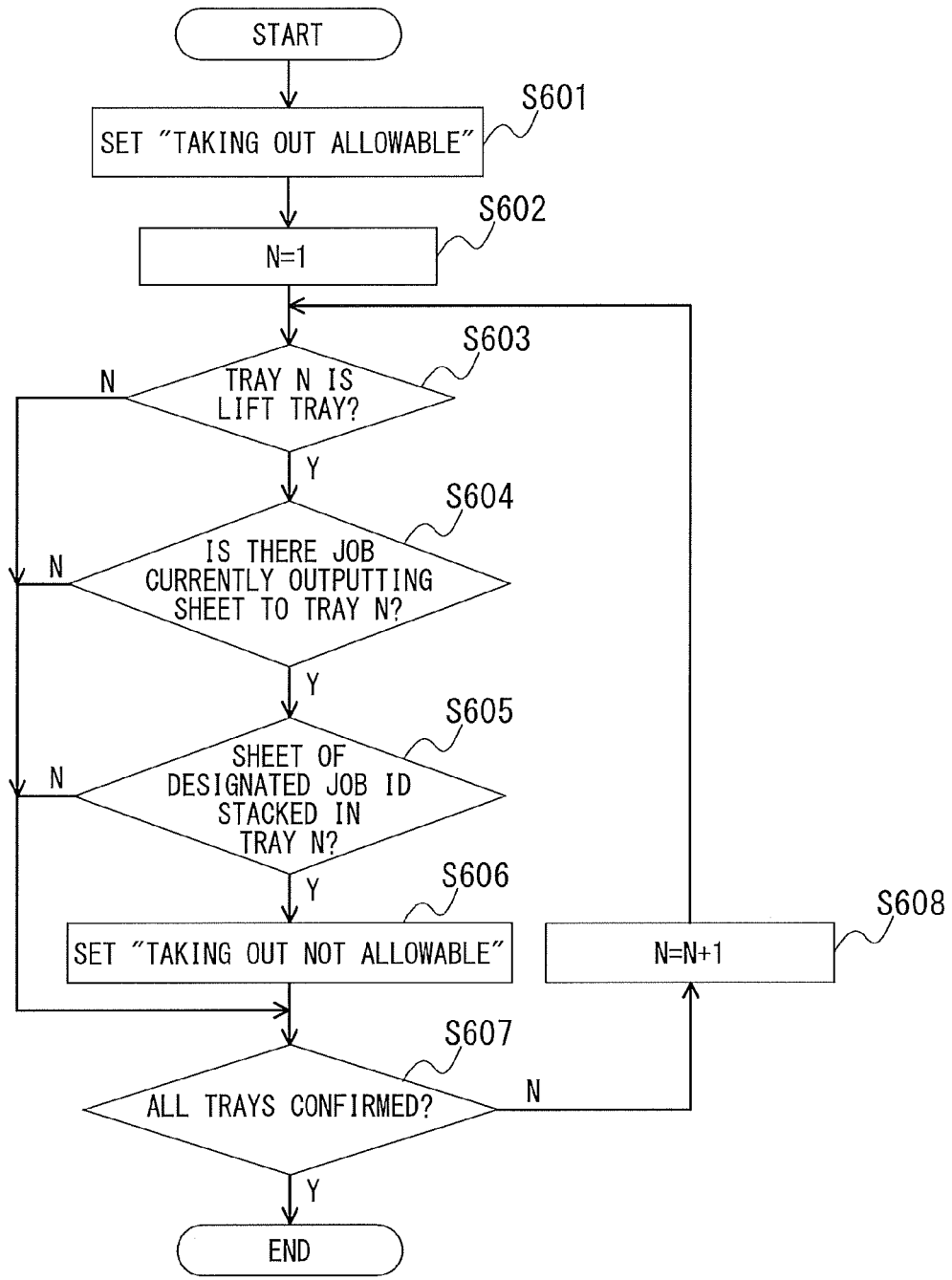
FIG. 17 is a flow chart for determining whether a sheet bundle can be taken out or not.

FIG. 17 is a control flow of processing for determining whether the sheet bundle can be taken out or not in relation to the subsequent image forming job. The control flow is executed by the control unit 111 of the information processing apparatus 100. In FIG. 17, the image forming job is simply described as "job". First, the control unit 111 initializes the internal variable, which indicates whether the sheet bundle can be taken out or not, to be take out allowable (Step S601). Next, the control unit 111 substitutes 1 for a variable N which represents the order of the discharge trays (Step S602), and then determines whether the tray N is a lift tray of a large capacity stacker or not (Step S603). If the tray N is a lift tray (Step S603: Y), the control unit 111 determines whether there is a job currently outputting (during sheet discharging) a sheet to the tray N (Step S604). In the determination, the control unit 111 retrieves, among the job information of the job data 130, a job which a job status represents that image forming being performed, and confirms whether the output destination is the tray N or not. If there is a job currently outputting a sheet to the tray N (Step S604: Y), the control unit 111 confirms the job ID of each sheet bundle information of the tray # N of the stack status information 133, thus determining whether the sheet bundle of the designated job ID is stacked or not (Step S605). When the sheet bundle of the designated job ID is stacked on the tray N (Step S605: Y), the control unit 111 sets the internal variable, which indicates whether the sheet bundle can be taken out or not, to be taken out not allowable (Step S606). In the control flow of FIG. 17, once the Step S606 is performed at least one time, then, the sheet bundle cannot be taken out.

Thereafter, the control unit 111 determines whether or not all trays have been confirmed or not (Step S607). When all the trays have been confirmed (Step S607: Y), the control unit 111 ends the series of processing. If the confirmation of all the trays has not been completed (Step S607: N), the control unit 111 adds 1 to the variable N (Step S608), and returns to Step S603. According to this control flow, the control unit 111 can confirm whether or not the sheet bundle can be taken out or not in Step S511, and if the sheet bundle cannot be taken out, the control unit 111 can render the sheet bundle in a special way, such as rendering the portion of the sheet bundle (M) in a third display color as in Step S514.

Second Embodiment

In the first embodiment, as illustrated in FIG. 13, a sheet bundle which cannot be taken out due to the subsequent job is displayed in another display color different from the normal color (default color). Thus, the operator can determine whether or not the sheet bundle of the designated image forming job can be taken out from the sheet discharge tray or not. It is noted that changing the display color is merely an example, and the present disclosure is not limited to the example of the first embodiment as long as the operator can determine whether or not the sheet bundle can be taken out from the sheet discharge tray. For example, as shown in FIG. 18, the operator may be notified whether or not the sheet bundle can be taken out by displaying a message indicating that the sheet bundle of the designated job cannot be taken out.

Figure 18:
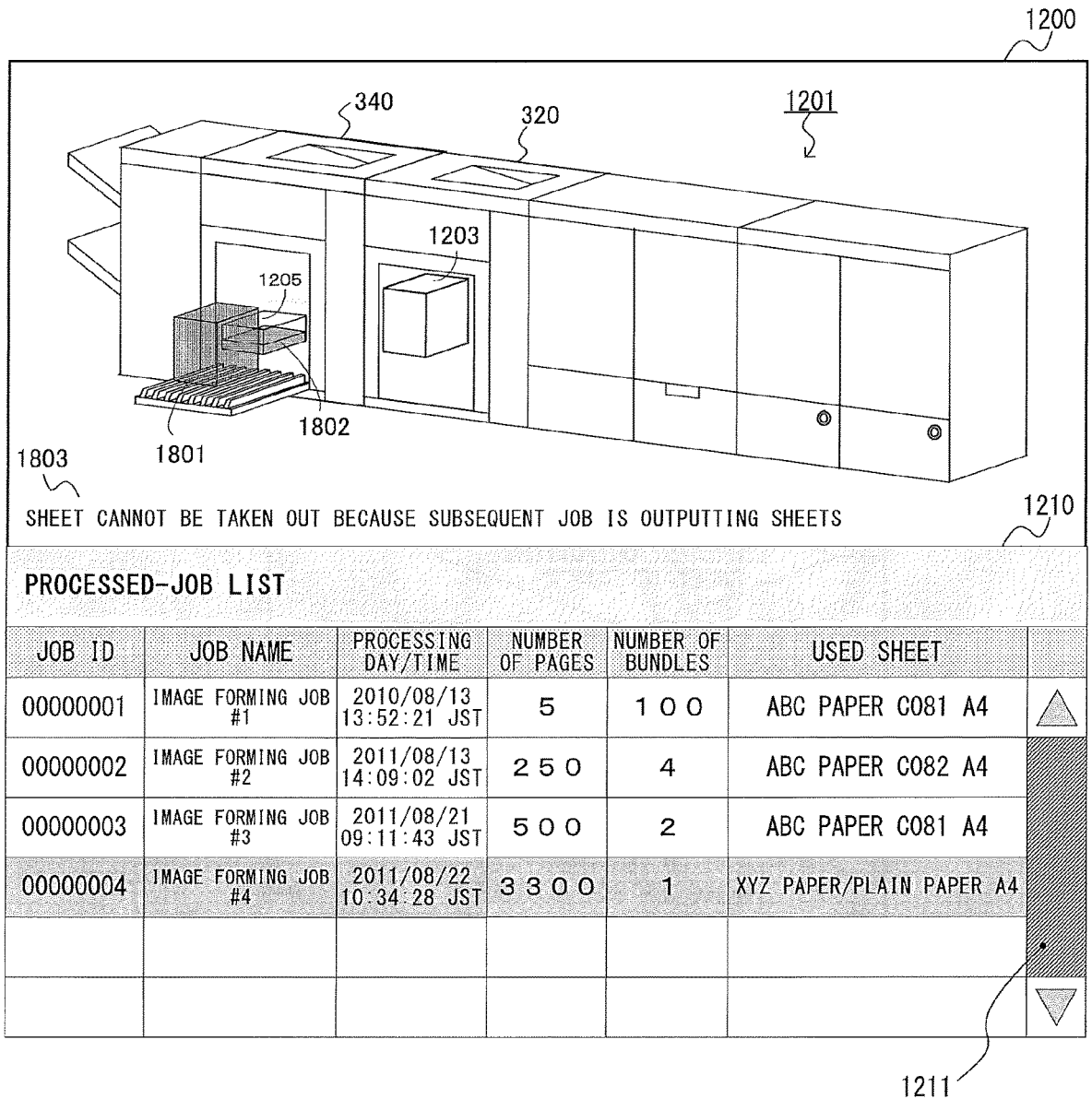
FIG. 18 is a display example of a monitor screen in a case where a sheet bundle cannot be taken out.

In the example of FIG. 18, the processed job (job name: image forming job #4) of the job ID "00000004" is designated on the processed job list, as in FIG. 13, and the sheet output in the subsequent image forming job is being discharged to a sheet bundle 1802. Therefore, the sheet bundle 1802 cannot be taken out because the subsequent job is outputting the sheet or sheets (as shown in reference number 1803). In the second embodiment, instead of changing the display color, a message 1801 indicating a cause for inhibiting taking the sheet bundle 1802 is displayed. The sheet bundles 1801 and 1802 are displayed in the same display color as the sheet bundle 1207; however, they may be displayed in the same display color as the sheet bundles 1301 and 1302.

Third Embodiment

Figure 19:
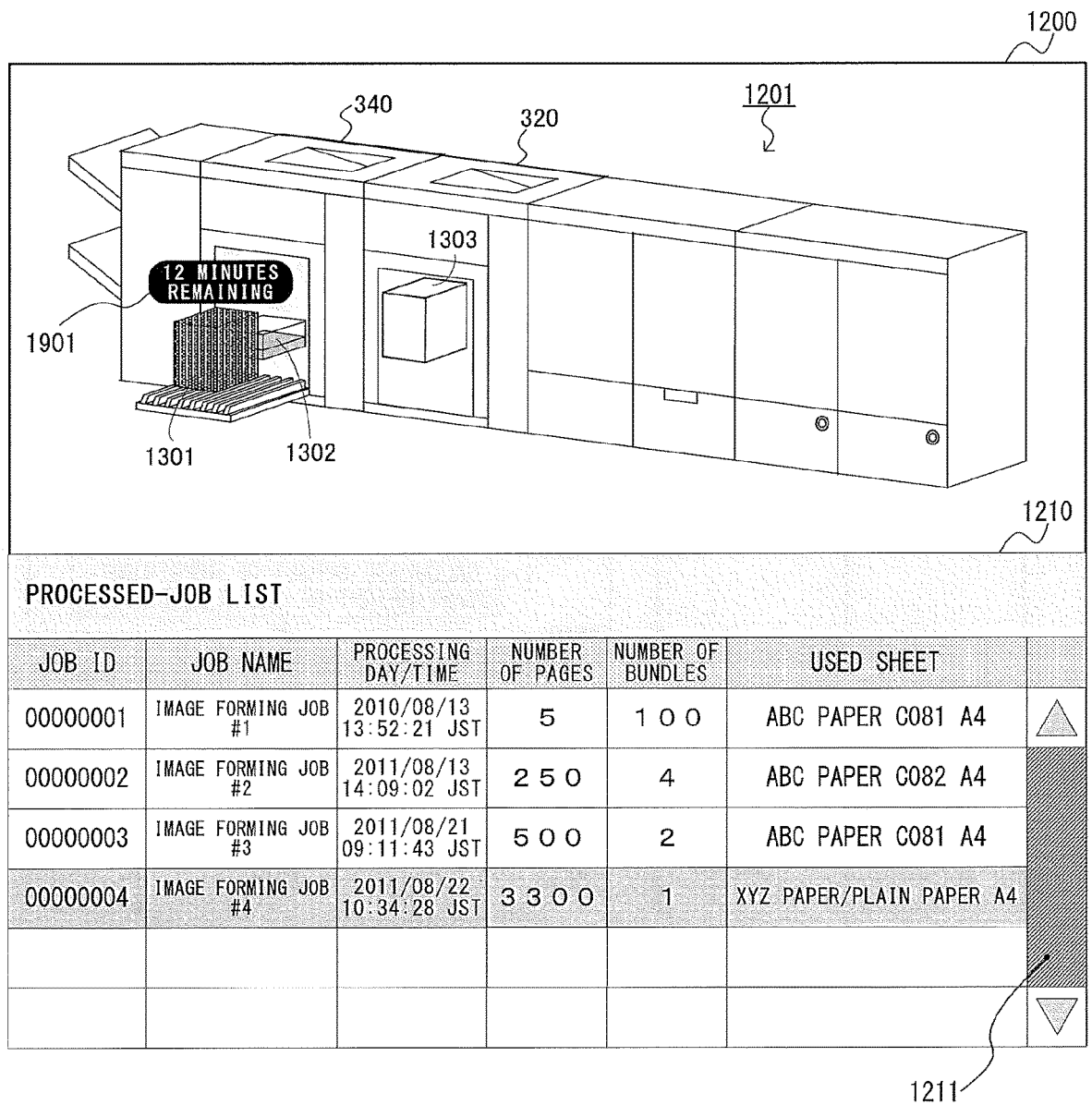
FIG. 19 is a display example of a monitor screen for displaying time until the sheet bundle can be taken out.

The third embodiment is directed to facilitate the determination of whether the sheet bundle can be taken out or not. Since a large-capacity stacker can stack several thousands of sheets, in a case where 100 sheets are discharged per minute in the image forming system, it is important to notify the user when the sheet can be taken out. FIG. 19 is an exemplary view of a monitor screen 1200 in the third embodiment. As shown in the upper part of FIG. 19, when the sheet bundle of the specified job cannot be taken out from the sheet discharge tray, a time (for example, 12 minutes remaining) 1901 that elapse before the sheet bundle can be taken out is displayed in the monitor screen 1200. The time may be displayed in seconds instead of minutes.

Figure 20:
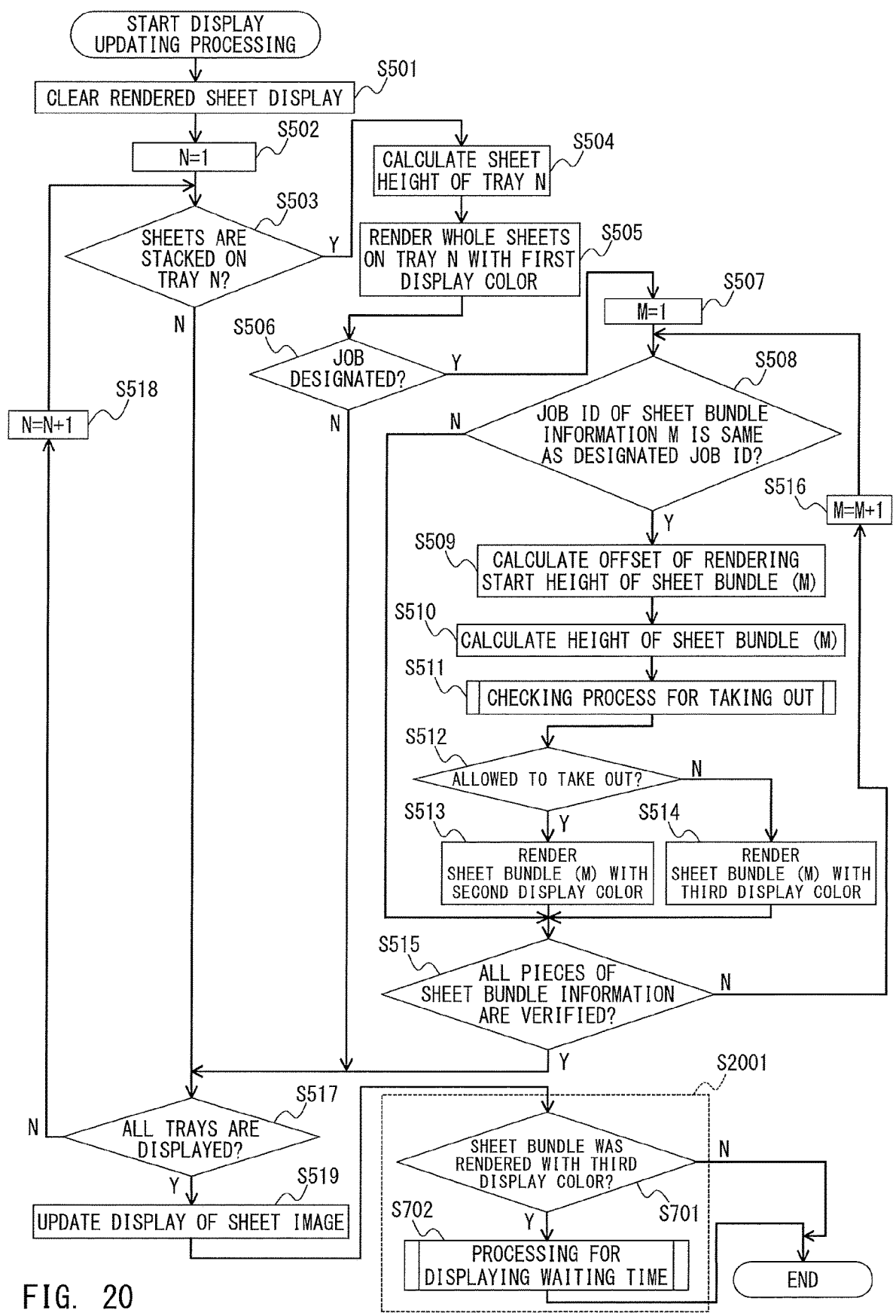
FIG. 20 is a flow chart for illustrating a display update procedure in an information processing apparatus.

Described in the third embodiment is display update processing which is performed when the image forming apparatus 101 receives the loading status information 133 or when the content of the image forming job or the processed job changes. FIG. 20 is a control flow executed by the control unit 111 of the information processing apparatus 100 at this time. As described above, when the sheet bundle of the designated image forming job cannot be taken out from the sheet discharge tray, the sheet bundle is displayed in a third display color, and a time that elapses before the sheet bundle can be taken out is displayed. Therefore, the control flow of the display update process of FIG. 20 includes the control flow described in S2001 as well as the control flow of FIG. 14. In the control flow of FIG. 20, Step S501 to Step S519 are the same as those in FIG. 14.

After updating the display of the sheet image in the second display layer in Step S519, the control unit 111 determines whether or not the sheet bundle was rendered with the third display color (Step S701). In a case where the image forming job is designated and the sheet bundle cannot be taken out from the sheet discharge tray, the image of the sheet bundle is rendered with the third display color (Step S701: Y). At this time, the control unit 111 performs processing for displaying a waiting time, i.e., a time that elapses before the sheet bundle can be taken out (Step S702). The details of Step S702 will be described with reference to FIG. 21. If the image was not rendered with the third display color (Step S701: N), the processing of Step S702 is not performed, and the series of processing is ended.

Figure 21:
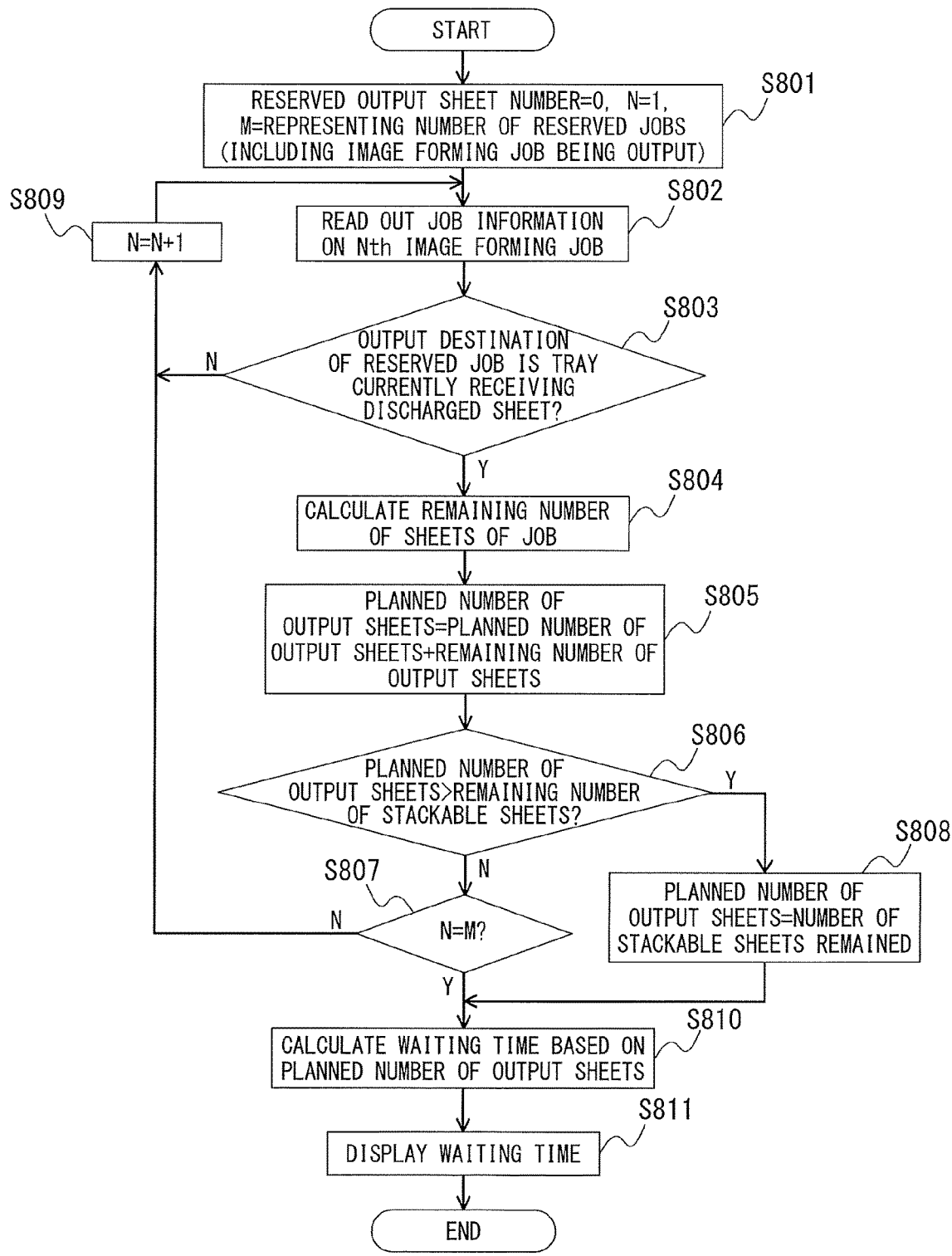
FIG. 21 is a flow chart for illustrating processing for displaying a waiting time in an information processing apparatus.

FIG. 21 is a control flow of the processing of Step S702, which is executed by the control unit 111 of the information processing apparatus 100. When this control flow is performed, the control unit 111 initializes internal variables (Step S801). Specifically, in the initialization, 0 is substituted for the reserved output sheet number, and 1 is substituted for the image formation job counter variable N. The scheduled output number is the sum of the number of output sheets of all the reserved image forming jobs discharged to the lift tray, and is for calculating the time that elapses before the sheet bundle can be taken out.

Further, the number of image forming jobs present in the job data 130 shown in FIG. 5 is substituted for a variable M representing the number of reserved jobs including the image forming job being output. Then, the control unit 111 reads out job information of the Nth image forming job from the job data 130 (Step S802). After that, the control unit 111 determines whether or not the output destination of the read job information is the lift tray which is determined to be unable to take out the sheet bundle in the control flow of FIG. 17 (Step S803). For this determination, the tray number of the lift tray is stored at the time when processing S606 is performed in the control flow of FIG. 17. Alternatively, the tray number may be identified and stored again in the control flow of FIG. 21, as in the control flow of FIG. 17.

In a case where the output destination of the N-th image forming job is the lift tray currently being output (Step S803: Y), the remaining number of sheets is calculated by subtracting the number of discharged sheets from the number of output sheets in the job information of the N-th image forming job (Step S804). If the output destination of the Nth image forming job is not the lift tray currently being output (S803: N), 1 is added to the variable N (Step S809), and the processing returns to Step S802. After calculating the remaining number of output sheets of the Nth image forming job in Step S804, the remaining number of output sheets is added to a planned number of output sheets (Step S805).

In the third embodiment, because the reserved image forming job is also continuously formed after completing the former image forming job, the time for completing all of the reserved image forming job includes the time that elapses before the sheet bundle can be taken out. Then, it is determined whether the calculated planned number of output sheets exceeds the remaining number of stackable sheets in the lift tray currently being output (Step S806). If the calculated planned number of output sheets exceeds the remaining number (Step S806: Y), because the planned number of the sheets to be output to the lift tray is the same as the remaining number of stackable sheets in this case, the number of stackable sheets remaining is substituted for the planned number of sheets to be output (Step S808). If the calculated planned number of output sheets does not exceed the remaining number (Step S806: N), it is determined whether N and M are identical (Step S807) or not. If identical (Step S807: Y), it means that all the reserved image formation jobs have been confirmed; therefore, the time that elapses before the sheet bundle is allowed to be taken out is calculated based on the planned number of output sheets (Step S810). If not identical (Step S807: N), since there is a reserved image forming job which has not been confirmed yet, 1 is added to the variable N (Step S809), and the process returns to Step S802. The calculation of the time that elapses before the sheet bundle is allowed to be taken out in Step S810 is obtained by dividing the planned number of output sheets by the image forming speed of the image forming apparatus 101 (e.g., the number of sheets which can be obtained by image formation in one minute) determined for each sheet size.

Thereafter, as shown in a reference number 1901 in FIG. 19, the time that elapses before the sheet bundle is allowed to be taken out is displayed (Step S811). In the third embodiment, in order to simplify the control flow, all sheets are formed at the same image forming speed; however, it is possible to assign different image forming speeds for the sheets according to the size and/or type of the sheets. In this case, the speed calculation is performed by calculating, for each sheet to which a different image forming speed is assigned, the image forming time and adding the same to obtain the time that elapses before the sheet bundle is allowed to be taken out.

Other Embodiment

In the first embodiment to the third embodiment, a configuration example in which the information processing apparatus 100 and the image forming apparatus 101 are separate members is described, but the image forming apparatus 101 may have the function of the information processing apparatus 100. That is, the image forming apparatus 101 may include the storage 112, the display 113, and the input portion 114. In this case, the functions performed by the controller 111 are achieved by the controller 121.

One object of the present invention is to provide an apparatus for easily determining whether a sheet corresponding to a designated image forming job can be immediately taken out from a stacking unit or not.

According to the present invention, when the image-formed sheet discharged by the designated processed job cannot be taken out from the sheet stacking means, the image-formed sheet is highlighted, and the image-formed sheet is collected and the process proceeds to the next step.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to embodiments, it is to be understood that the disclosure is not limited to the disclosed embodiments. The scope of the following claims is to be accorded the broadest interpretation to encompass all such modifications and equivalent structures and functions.

This application claims the benefit of Japanese Patent Application No. 2018-108582, filed Jun. 6, 2018, which is hereby incorporated by reference herein in its entirety.

What is claimed is:

1. An image forming apparatus comprising:
an image forming unit configured to form an image on a sheet based on an image forming job;
a sheet stacking unit on which a sheet, which is discharged from the image forming unit, having an image formed thereon is to be stacked;
a storage unit configured to store stack state information and list information of a processed job for which the image forming has been performed, wherein the stack state information represents a sheet stack state of the sheet having the image formed thereon for each image forming job for the sheet stacking unit; and a control unit configured to generate, for each image forming job, a sheet image which visualizes the sheet stack state of the sheet stacking unit based on the sheet stacking information, and to control a display unit to display the sheet image;

wherein the control unit is configured to:
   determine, upon detecting that any one of the processed jobs is designated from the list information, whether or not the sheet having the image formed thereon which is discharged by the designated processed job is allowed to be taken out from the sheet stacking unit, and
   control, in a case where the sheet is not allowed to be taken out, the display unit to display the sheet image corresponding to the designated processed job in a manner which is different from that for displaying the sheet image corresponding to the designated processed job in a case where the sheet is allowed to be taken out.

2. The image forming apparatus according to claim 1, wherein, in a case where the image forming processing is currently performed in a following image forming job and the sheet discharged by the following image forming job is being discharged on the sheet stacking unit which is identical to the sheet stacking unit on which the sheet having the image formed thereon has been discharged by the designated processed job, the control unit is configured to determine that the sheet having the image formed thereon which has been discharged by the designated processed job is not allowed to be taken out from the sheet stacking unit.

3. The image forming apparatus according to claim 1, wherein, in a case where the sheets having the image formed thereon discharged by the designated processed job are stacked on a plurality of the sheet stacking units, the control unit is configured to control the display unit to display a plurality of the sheet images representing the sheets having the image formed thereon in a same mode of displaying.

4. The image forming apparatus according to claim 1, wherein, in a case where the sheet having the image formed thereon discharged by another image forming job is also discharged on the sheet stacking unit on which the sheet having the image formed thereon has been discharged by the designated processed job, the control unit is configured to control the display unit to display the sheet having the image formed thereon which is discharged by the designated processed job to be distinguished from the sheet having the image formed thereon which is discharged by the other image forming job.

5. The image forming apparatus according to claim 1, wherein the control unit is configured to control the display unit to:
   display a portion of the sheet image in a first display color, the portion corresponding to the sheet having the image formed thereon which has been discharged by the designated processed job,
   display, in a case where the sheet having the image formed thereon is allowed to be taken out, the portion of the sheet image in a second display color which is different from the first display color, and
   display, in a case where the sheet having the image formed thereon is not allowed to be taken out, the portion of the sheet image in a third display color which is different from either of the first display color and the second display color.

6. The image forming apparatus according to claim 5, wherein
   in a case where the image forming processing is currently performed in a following image forming job to discharge the sheet having the image formed thereon on the sheet stacking unit on which the sheet having the image formed thereon has been discharged by the designated processed job, the control unit is configured to control the display unit to display the portion of the sheet image which corresponds to the sheet having the image formed thereon in the third display color.

7. The image forming apparatus according to claim 6, wherein the control unit is configured to control the display unit to display, instead of displaying the portion with third display color or with the portion being displayed in the third display color, a message representing a cause for inhibiting taking the sheet having the image formed thereon out of the sheet stacking unit.

8. The image forming apparatus according to claim 6, wherein the control unit is configured to:
   calculate, based on the number of the sheets having the image formed thereon which is formed by the following image forming job, a waiting time that elapses before the sheet having the image formed thereon which is discharged by the designated processed job is allowed to be taken out from the sheet stacking unit; and
   control the display unit to display the waiting time.

9. An information processing apparatus comprising:
   a communication unit configured to communicate with an image forming apparatus to which a sheet stacking unit is connected, the image forming apparatus having an image forming unit configured to form an image on a sheet based on an image forming job and a job input unit configured to input the image forming job to the image forming unit, wherein a sheet, which is discharged from the image forming unit, having an image formed thereon is to be stacked on the sheet stacking unit;
   a storage unit configured to obtain stack state information and list information of a processed job for which the image forming has been performed and store the obtained stack state information and the obtained list information, wherein the stack state information represents a sheet stack state of the sheet having the image formed thereon for each image forming job for the sheet stacking unit; and
   a control unit configured to:
      generate, for each image forming job, a sheet image which visualizes the sheet stack state of the sheet stacking unit based on the sheet stacking information;
      control a display unit to display the sheet image;
      determine, upon detecting that any one of the processed jobs is designated from the list information, whether or not the sheet having the image formed thereon which is discharged by the designated processed job is allowed to be taken out from the sheet stacking unit; and
      control, in a case where the sheet is not allowed to be taken out, the display unit to display the sheet image corresponding to the designated processed job in a manner which is different from that for displaying the sheet image corresponding to the designated processed job in a case where the sheet is allowed to be taken out.

10. The information processing apparatus according to claim 9, wherein, in a case where the image forming processing is currently performed in a following image forming job and the sheet discharged by the following image forming job is being discharged on the sheet stacking unit which is identical to the sheet stacking unit on which the sheet having the image formed thereon has been discharged by the designated processed job, the control unit is configured to determine that the sheet having the image formed thereon which has been discharged by the designated processed job is not allowed to be taken out from the sheet stacking unit.

11. A non-transitory computer readable storage medium storing a computer program to cause a computer to perform a method, wherein the computer is to be included in an image forming apparatus comprising:

an image forming unit, to which a display unit is connected, configured to form an image on a sheet based on an image forming job; and a sheet stacking unit on which a sheet, which is discharged from the image forming unit, having an image formed thereon is to be stacked, the method comprising:

storing stack state information and list information of a processed job for which the image forming has been performed, wherein the stack state information represents a sheet stack state of the sheet having the image formed thereon for each image forming job for the sheet stacking unit;

generating, for each image forming job, a sheet image which visualizes the sheet stack state of the sheet stacking unit based on the sheet stacking information;

controlling the display unit to display the sheet image;

determining, upon detecting that any one of the processed jobs is designated from the list information, whether or not the sheet having the image formed thereon which is discharged by the designated processed job is allowed to be taken out from the sheet stacking unit, and controlling, in a case where the sheet is not allowed to be taken out, the display unit to display the sheet image corresponding to the designated processed job in a manner which is different from that for displaying the sheet image corresponding to the designated processed job in a case where the sheet is allowed to be taken out.

12. A non-transitory computer readable storage medium storing a computer program to cause a computer to perform a method, wherein the computer is operable to communicate with an image forming apparatus comprising:

an image forming unit, to which a display unit is connected, configured to form an image on a sheet based on an image forming job; and a sheet stacking unit on which a sheet, which is discharged from the image forming unit, having an image formed thereon is to be stacked, the method comprising:

obtaining stack state information and list information of a processed job for which the image forming has been performed, wherein the stack state information represents a sheet stack state of the sheet having the image formed thereon for each image forming job for the sheet stacking unit;

storing the obtained stack state information and the obtained list information of the processed job;

generating, for each image forming job, a sheet image which visualizes the sheet stack state of the sheet stacking unit based on the sheet stacking information;

controlling the display unit to display the sheet image;

determining, upon detecting that any one of the processed jobs is designated from the list information, whether or not the sheet having the image formed thereon which is discharged by the designated processed job is allowed to be taken out from the sheet stacking unit; and controlling, in a case where the sheet is not allowed to be taken out, the display unit to display the sheet image corresponding to the designated processed job in a manner which is different from that for displaying the sheet image corresponding to the designated processed job in a case where the sheet is allowed to be taken out.

* * * * *